US009601161B2

(12) United States Patent
McGuire, Jr. et al.

(10) Patent No.: US 9,601,161 B2
(45) Date of Patent: Mar. 21, 2017

(54) METALLICALLY SEALED, WRAPPED HARD DISK DRIVES AND RELATED METHODS

(71) Applicant: entrotech, inc., Columbus, OH (US)

(72) Inventors: James E. McGuire, Jr., Tiburon, CA (US); Andrew C. Strange, Worthington, OH (US)

(73) Assignee: entroteech, inc., Columbus, OH (US)

( * ) Notice: Subject to any disclaimer, the term of this patent is extended or adjusted under 35 U.S.C. 154(b) by 0 days.

(21) Appl. No.: 14/687,437

(22) Filed: Apr. 15, 2015

(65) Prior Publication Data

US 2016/0307606 A1   Oct. 20, 2016

(51) Int. Cl.
*G11B 33/14* (2006.01)
(52) U.S. Cl.
CPC ...... *G11B 33/1486* (2013.01); *G11B 33/1406* (2013.01); *G11B 33/148* (2013.01); *G11B 33/1446* (2013.01); *G11B 33/1493* (2013.01)
(58) Field of Classification Search
CPC . G11B 25/043; G11B 33/1466; G11B 33/148; G11B 33/122; G11B 33/022; G11B 33/1446; G11B 33/146; G11B 33/1493; G11B 33/025; G11B 33/14
USPC ............................... 360/97.12, 97.22, 99.21
See application file for complete search history.

(56) References Cited

U.S. PATENT DOCUMENTS

| 3,596,828 A | * | 8/1971 | Foster | A24F 23/02 206/245 |
| 4,058,632 A | * | 11/1977 | Evans | B65D 75/58 206/484 |
| 4,096,309 A | * | 6/1978 | Stillman | B32B 15/08 229/5.82 |
| 4,284,672 A | * | 8/1981 | Stillman | B32B 15/08 206/524.2 |
| 4,306,259 A | | 12/1981 | Saito et al. | |

(Continued)

FOREIGN PATENT DOCUMENTS

DE    102006058376 A1 *  4/2008  ............ B23K 35/22
EP       0 546 680         6/1993
(Continued)

OTHER PUBLICATIONS

"Donaldson Filtration Systems Adsorbent Label Filter (ALF): Disk Drive," Donaldson Company, Inc., Minneapolis, MN (Jul. 31, 2010).

(Continued)

*Primary Examiner* — Will J Klimowicz
(74) *Attorney, Agent, or Firm* — The Griffith Law Firm, A P.C.; Lisa M. Griffith

(57) ABSTRACT

Hard disk drives of the invention are wrapped in wraps for enhanced sealing of the hard disk drive. Wrapped hard disk drives of the invention comprise: an enclosed hard disk drive housing comprising a base and a cover enclosed around internal components for facilitating reading and recording of data at a desired location on at least one disk contained within the housing; and a wrap wrapped and metallically sealed around the enclosed hard disk drive housing in an at least partially overlapping manner to form the wrapped hard disk drive and prevent undesired migration therethrough such that a sealed environment exists within the wrapped hard disk drive.

31 Claims, 8 Drawing Sheets

(56) References Cited

U.S. PATENT DOCUMENTS

| | | | |
|---|---|---|---|
| 4,367,503 A | 1/1983 | Treseder | |
| 4,642,715 A | 2/1987 | Ende | |
| 4,662,521 A * | 5/1987 | Moretti | B32B 15/08 |
| | | | 206/484 |
| 4,686,592 A | 8/1987 | Carroll et al. | |
| 4,795,907 A | 1/1989 | Maekawa et al. | |
| 4,855,849 A | 8/1989 | Jones et al. | |
| 4,965,691 A | 10/1990 | Iftikar et al. | |
| 5,025,335 A | 6/1991 | Stefansky | |
| 5,147,086 A * | 9/1992 | Fujikawa | B22F 3/1258 |
| | | | 228/186 |
| 5,150,267 A | 9/1992 | Reinisch | |
| 5,157,831 A | 10/1992 | Wang et al. | |
| 5,175,657 A | 12/1992 | Iftikar et al. | |
| 5,214,550 A | 5/1993 | Chan | |
| 5,233,491 A | 8/1993 | Kadonaga et al. | |
| 5,235,481 A | 8/1993 | Kamo et al. | |
| 5,243,495 A | 9/1993 | Read et al. | |
| 5,247,410 A | 9/1993 | Ebihara et al. | |
| 5,253,129 A | 10/1993 | Blackborow et al. | |
| 5,270,887 A | 12/1993 | Edwards et al. | |
| 5,282,099 A | 1/1994 | Kawagoe et al. | |
| 5,317,463 A | 5/1994 | Lemke et al. | |
| 5,376,424 A * | 12/1994 | Watanabe | B32B 1/06 |
| | | | 206/524.8 |
| 5,454,157 A | 10/1995 | Ananth et al. | |
| 5,536,917 A | 7/1996 | Suppelsa et al. | |
| 5,559,650 A | 9/1996 | Repphun et al. | |
| 5,587,854 A | 12/1996 | Sato et al. | |
| 5,587,855 A | 12/1996 | Kim | |
| 5,608,592 A | 3/1997 | Mizoshita et al. | |
| 5,703,735 A | 12/1997 | Bleeke | |
| 5,722,538 A | 3/1998 | Neely et al. | |
| 5,732,063 A | 3/1998 | Chen | |
| 5,751,514 A | 5/1998 | Hyde et al. | |
| 5,781,373 A | 7/1998 | Larson et al. | |
| 5,837,934 A | 11/1998 | Valavanis et al. | |
| 5,880,904 A | 3/1999 | Mizoshita et al. | |
| 5,898,537 A | 4/1999 | Oizumi et al. | |
| 5,969,901 A | 10/1999 | Eckberg et al. | |
| 6,008,965 A | 12/1999 | Izumi et al. | |
| 6,023,392 A | 2/2000 | Kim | |
| 6,108,164 A | 8/2000 | Weber | |
| 6,129,579 A | 10/2000 | Cox et al. | |
| 6,168,459 B1 | 1/2001 | Cox et al. | |
| 6,181,530 B1 | 1/2001 | Ratliff et al. | |
| 6,226,143 B1 | 5/2001 | Stefanksy | |
| 6,236,532 B1 | 5/2001 | Yanagisawa | |
| 6,243,262 B1 | 6/2001 | Koo et al. | |
| 6,258,432 B1 | 7/2001 | Terada et al. | |
| 6,317,286 B1 | 11/2001 | Murphy et al. | |
| 6,339,521 B1 | 1/2002 | Durrum et al. | |
| 6,357,001 B1 | 3/2002 | Brower et al. | |
| 6,392,838 B1 * | 5/2002 | Hearn | G11B 25/043 |
| | | | 29/603.03 |
| 6,397,932 B1 | 6/2002 | Calaman et al. | |
| 6,407,659 B2 | 6/2002 | Mochida et al. | |
| 6,430,000 B1 | 8/2002 | Rent | |
| 6,438,685 B1 * | 8/2002 | Brower | G11B 33/1493 |
| | | | 206/308.3 |
| 6,442,021 B1 | 8/2002 | Bolognia et al. | |
| 6,469,864 B2 | 10/2002 | Kamezawa et al. | |
| 6,473,264 B2 | 10/2002 | Bae et al. | |
| 6,480,353 B1 | 11/2002 | Sacks et al. | |
| 6,525,899 B2 | 2/2003 | Hearn et al. | |
| 6,560,064 B1 | 5/2003 | Hirano | |
| 6,570,736 B2 | 5/2003 | Noda | |
| 6,639,757 B2 | 10/2003 | Morley et al. | |
| 6,646,821 B2 | 11/2003 | Bernett et al. | |
| 6,650,961 B2 | 11/2003 | Deckers | |
| 6,673,460 B2 | 1/2004 | Imai et al. | |
| 6,678,112 B1 | 1/2004 | Kaneko | |
| 6,693,767 B1 | 2/2004 | Butler | |
| 6,762,909 B2 | 7/2004 | Albrecht et al. | |
| 6,765,751 B2 | 7/2004 | Huang et al. | |
| 6,785,082 B2 | 8/2004 | Fiorvanti et al. | |
| 6,831,811 B1 | 12/2004 | Andrikowich et al. | |
| 6,876,514 B1 | 4/2005 | Little | |
| 6,934,118 B2 | 8/2005 | Hidaka et al. | |
| 6,934,958 B2 | 8/2005 | Lin et al. | |
| 6,940,687 B2 | 9/2005 | Hong et al. | |
| 7,054,153 B2 | 5/2006 | Lewis et al. | |
| 7,082,012 B2 | 7/2006 | Macpherson et al. | |
| 7,119,984 B2 | 10/2006 | Macleod et al. | |
| 7,130,149 B2 | 10/2006 | Hong et al. | |
| 7,206,164 B2 | 4/2007 | Hofland et al. | |
| 7,218,473 B2 | 5/2007 | Bernett et al. | |
| 7,239,593 B2 | 7/2007 | Abe | |
| 7,274,534 B1 | 9/2007 | Choy et al. | |
| 7,285,318 B2 * | 10/2007 | Kaku | B32B 3/02 |
| | | | 428/195.1 |
| 7,295,399 B2 | 11/2007 | Konno et al. | |
| 7,300,500 B2 | 11/2007 | Okada et al. | |
| 7,301,776 B1 | 11/2007 | Wang et al. | |
| 7,315,447 B2 | 1/2008 | Inoue et al. | |
| 7,330,334 B2 | 2/2008 | Shimizu et al. | |
| 7,362,541 B2 | 4/2008 | Bernett et al. | |
| 7,414,813 B2 | 8/2008 | Huynh | |
| 7,420,771 B1 | 9/2008 | Hanke et al. | |
| 7,484,291 B1 | 2/2009 | Ostrander et al. | |
| 7,508,622 B2 | 3/2009 | Martin et al. | |
| 7,525,758 B2 | 4/2009 | Abe | |
| 7,616,400 B2 | 11/2009 | Byun et al. | |
| 7,630,169 B2 | 12/2009 | Murakami | |
| 7,684,146 B1 | 3/2010 | Andrikowich et al. | |
| 7,813,129 B2 | 10/2010 | Van Der Werff | |
| 7,821,735 B1 | 10/2010 | Bogacz et al. | |
| 8,014,167 B2 | 9/2011 | Gunderson et al. | |
| 8,018,687 B1 | 9/2011 | Little et al. | |
| 8,098,454 B2 | 1/2012 | Kouno et al. | |
| 8,194,348 B2 | 6/2012 | Jacoby et al. | |
| 8,248,777 B2 | 8/2012 | Prest | |
| 8,274,755 B2 | 9/2012 | Ishima et al. | |
| 8,427,787 B2 | 4/2013 | McGuire, Jr. | |
| 8,451,559 B1 | 5/2013 | Berding et al. | |
| 8,533,934 B2 | 9/2013 | McGuire, Jr. et al. | |
| 8,593,760 B2 | 11/2013 | McGuire, Jr. | |
| 8,599,514 B2 | 12/2013 | McGuire, Jr. | |
| 8,659,849 B2 | 2/2014 | Hayakawa et al. | |
| 8,859,913 B2 * | 10/2014 | Judy | H05K 9/0043 |
| | | | 174/378 |
| 9,190,115 B2 | 11/2015 | McGuire, Jr. et al. | |
| 9,466,335 B2 | 10/2016 | McGuire, Jr. | |
| 2001/0042301 A1 | 11/2001 | Khuu | |
| 2002/0149885 A1 | 10/2002 | Dague et al. | |
| 2002/0196580 A1 | 12/2002 | Tsukahara et al. | |
| 2003/0081347 A1 * | 5/2003 | Neal | G11B 5/102 |
| | | | 360/99.15 |
| 2003/0081349 A1 | 5/2003 | Bernett | |
| 2003/0089417 A1 | 5/2003 | Bernett | |
| 2003/0179488 A1 | 9/2003 | Kant et al. | |
| 2003/0179489 A1 | 9/2003 | Bernett et al. | |
| 2003/0223148 A1 | 12/2003 | Macleod et al. | |
| 2004/0070867 A1 | 4/2004 | Kudo et al. | |
| 2004/0134825 A1 * | 7/2004 | Navickas | B42F 7/08 |
| | | | 206/528 |
| 2004/0150909 A1 | 8/2004 | Kimura et al. | |
| 2004/0169956 A1 | 9/2004 | Oba et al. | |
| 2004/0184184 A1 | 9/2004 | Komatsu et al. | |
| 2004/0207980 A1 | 10/2004 | Kobayashi | |
| 2005/0013039 A1 | 1/2005 | Matsumura et al. | |
| 2005/0041334 A1 | 2/2005 | Kim et al. | |
| 2005/0057849 A1 * | 3/2005 | Twogood | G11B 33/022 |
| | | | 360/97.12 |
| 2005/0094312 A1 | 5/2005 | Sato | |
| 2005/0130457 A1 | 6/2005 | Nozaki et al. | |
| 2005/0237708 A1 | 10/2005 | Chen | |
| 2006/0050429 A1 | 3/2006 | Gunderson et al. | |
| 2006/0139873 A1 | 6/2006 | Tomizawa et al. | |
| 2006/0176610 A1 | 8/2006 | Tsuda et al. | |
| 2007/0002489 A1 | 1/2007 | Abe | |
| 2007/0034406 A1 * | 2/2007 | Schroader | H05K 9/0043 |
| | | | 174/380 |

(56) References Cited

U.S. PATENT DOCUMENTS

| | | |
|---|---|---|
| 2007/0171567 A1 | 7/2007 | Choi et al. |
| 2008/0084631 A1 | 4/2008 | Chan et al. |
| 2008/0088969 A1 | 4/2008 | Uefune et al. |
| 2008/0174910 A1 | 7/2008 | Hirono et al. |
| 2008/0212237 A1 | 9/2008 | Uefune et al. |
| 2008/0226534 A1 | 9/2008 | Gidumal et al. |
| 2009/0073328 A1 | 3/2009 | Gunderson et al. |
| 2009/0073842 A1 | 3/2009 | Kim |
| 2009/0116141 A1 | 5/2009 | Brown |
| 2009/0183475 A1 | 7/2009 | Dauber et al. |
| 2009/0256244 A1 | 10/2009 | Liao et al. |
| 2009/0290294 A1 | 11/2009 | Prest |
| 2011/0122567 A1 | 5/2011 | Cheah et al. |
| 2011/0135949 A1 | 6/2011 | Elia |
| 2011/0212281 A1* | 9/2011 | Jacoby .......... G11B 25/043 428/35.8 |
| 2012/0120562 A1 | 5/2012 | Prest et al. |
| 2012/0164446 A1 | 6/2012 | Nakahira et al. |
| 2012/0275052 A1 | 11/2012 | McGuire, Jr. |
| 2012/0275053 A1 | 11/2012 | McGuire, Jr. |
| 2012/0275054 A1 | 11/2012 | McGuire, Jr. |
| 2012/0275055 A1 | 11/2012 | McGuire, Jr. |
| 2012/0275056 A1 | 11/2012 | McGuire, Jr. |
| 2012/0275057 A1 | 11/2012 | McGuire, Jr. |
| 2012/0275105 A1 | 11/2012 | McGuire, Jr. |
| 2012/0275106 A1 | 11/2012 | McGuire, Jr. |
| 2012/0275285 A1 | 11/2012 | McGuire, Jr. |
| 2012/0275286 A1* | 11/2012 | McGuire, Jr. .......... G11B 25/043 369/75.11 |
| 2012/0275287 A1* | 11/2012 | McGuire, Jr. .......... G11B 25/043 369/75.11 |
| 2013/0277101 A1 | 10/2013 | Judy |
| 2014/0118927 A1* | 5/2014 | Hamburgen .......... G06F 1/203 361/679.54 |
| 2015/0069056 A1* | 3/2015 | Kishimoto .......... B65D 77/04 220/23.87 |
| 2016/0104515 A1 | 4/2016 | Strange |

FOREIGN PATENT DOCUMENTS

| | | | |
|---|---|---|---|
| GB | 0 173 783 | | 1/1923 |
| GB | 1 475 080 | | 6/1977 |
| JP | 06008947 A | * | 1/1994 |
| JP | 6-218799 | | 8/1994 |
| JP | 08045256 A | * | 2/1996 |
| JP | 10055662 A | * | 2/1998 |
| JP | 2000-215642 | | 8/2000 |
| JP | 2011240934 A | * | 12/2011 |
| WO | WO-2005/117018 | | 12/2005 |
| WO | WO-2015/164551 | | 10/2015 |
| WO | WO-2015/191479 | | 12/2015 |

OTHER PUBLICATIONS

"Donaldson Filtration Systems Adsorbent Pouch Filter (APF): Disk Drive," Donaldson Company, Inc., Minneapolis, MN (Jul. 31, 2010).
"First Hermetically Sealed, Helium HDD Platform Provides Path for Higher Capacity Storage, While Significantly Lowering Power and Cooling, and Improving Storage Density," http://www.hgst.com/press-room/press-releases/hgst-ships-6TB-Ultrastar-HE6-helium-filled (Nov. 4, 2013).
"Infrared," http://en.wikipedia.org/wiki/Infrared (Feb. 14, 2011).
"Laser Makes Invisible Welds in Plastics," Connect, No. 100; http://www.twi.co.uk/content/c1008b.html (May 31, 1999).
"Laser Welding of Plastics (Knowledge Summary)," http://www.twi.co.uk/content/ksab002.html (Dec. 31, 2009).
"Nd:YAG laser," http://en.wikipedia.org/wiki/Nd:YAG_laser (Feb. 14, 2011).
Jones, Ian, "Clearweld (Knowledge Summary)," http://www.twi.co.uk/content/ksiaj001.html (Dec. 31, 2010).
Venkat, Sri et al., "Sealing Plastic Seams With Laser Welding," www.devicelink.com/mddi (May 31, 2008).
Warwick, Marcus et al., "Application Studies Using Through-Transmission Laser Welding of Polymers," http://www.twi.co.uk/content/spcmwapr2006.html (Apr. 25, 2006).

* cited by examiner

METALLICALLY SEALED, WRAPPED HARD DISK DRIVES AND RELATED METHODS

BACKGROUND OF THE INVENTION

The present invention relates generally to wrapped hard disk drives and methods for improved sealing thereof using metallic material.

Coating surfaces on hard disk drives is known for a variety of purposes. One such purpose is for containment of a gaseous medium within the hard disk drive. U.S. Patent Publication No. 2012/0275105 A1 describes providing at least one metal coating over at least a portion of an exterior surface of a hard disk drive. Coating a hard disk drive as such is described as providing improved sealing of inert gases within a hard disk drive. While effective for sealing inert gases within a hard disk drive, such methods typically require specialized processing equipment and methodology for application of the metal coating. For example, formation of a metal coating using sputter coating methodology requires use of costly sputter chambers for coating of the hard disk drive and tightly controlled processing conditions during manufacture of such hard disk drives.

Materials other than metal are also coated on hard disk drives for sealing and additional purposes. For example, U.S. Patent Publication No. 2012/0275286 A1 describes encapsulation of hard disk drives with polymeric coatings. The polymeric coatings are described as providing protective and/or decorative properties to the hard disk drive. U.S. Pat. No. 5,454,157 describes a disk drive assembly containing a metallic base and cover. In order to minimize escape of helium or nitrogen contained therein (via porosity in the metallic base and cover plates), a special electrostatic coating process and material called "E-coat" are used. E-coating, which is said to be a commercially available coating material and is known to be an insulative epoxy material, is applied to the surfaces of the base and cover as well as all other surfaces making up the hermetically sealed chamber. Such application of the E-coating takes place before the plates are assembled together. Every surface, inner and outer, of each plate is completely coated with a black E-coating as such. With the E-coating applied, the overall sealed chamber's porosity is purportedly lowered ninety-seven percent to an acceptable amount in order to contain the helium and nitrogen gas.

A hermetic seal is generally understood to be an airtight seal. Note that some seals (e.g., those "sealing" air within the hard disk drive) are not literally air tight, but rather utilize an extremely fine air filter in conjunction with air circulation inside the hard drive enclosure. The spinning of the disks causes air to circulate therein, forcing any particulates to become trapped on the filter. The same air currents also act as a gas bearing, which enables the heads to float on a cushion of air above the surfaces of the disks. However, "hermetically" sealed means that the seal is so airtight that the disk drive's internal pressure is substantially independent of the external or ambient pressure. This is in contrast to a conventional or non-hermetically sealed disk drive that has a breather port with a filter in a wall of the base plate or cover for equalizing the disk drive's internal pressure with the external pressure. Thus, a hermetically sealed drive does not contain a breather port.

Within a hermetically sealed hard disk drive, gases other than atmospheric air are often employed. Filling the sealed environment of a hard disk drive with gases other than air can enhance their performance. For example, use of lower density inert gases, such as helium, can reduce aerodynamic drag between the disks and their associated read/write heads by a factor of approximately five-to-one as compared to their operation in air. This reduced drag beneficially results in reduced power requirements for the spindle motor. A helium-filled drive, thus, uses substantially less power than a comparable hard disk drive operating in an air environment. At the same time, the helium gas also conducts heat generated during operation of the disk drive away more effectively than air.

Hermetically sealed hard disk drives are first filled with a desired gaseous medium (whether it be atmospheric air or one or more other gases) before operation. Then, if the constituency of the gaseous medium substantially changes due to leakage of the hard disk drive housing, the hard disk drive must be either discarded or refilled with the desired gaseous medium. Filling disk drives to a desired pressure and concentration of gaseous components, however, can be both time-consuming and difficult. A number of patent documents focus on providing and/or replenishing gases such as helium at a desired concentration within a hard disk drive. See, for example, U.S. Patent Publication Nos. 2003/0081349 and 2003/0089417. Also see U.S. Pat. No. 6,560,064.

Due to imperfect sealing of hard disk drive housings, the benefits of using lower density gases such as helium are conventionally not longstanding. Potential paths of leakage (allowing both air flow into the hard disk drive housing and allowing gas outflow from the hard disk drive housing) include those paths existing at the junction of two mating components thereof. Those components include, for example, screws or other mechanical fasteners used to conventionally fasten multiple parts of the housing together. In addition, gasket seals and the like used to improve the seal between multiple components are often susceptible to at least some leakage. As gas such as helium leaks out of a sealed hard disk drive, air leaks in (or vice versa), causing undesirable effects in the operation of the disk drives—even possibly causing the disk drives to catastrophically fail. For example, an increased concentration of air inside the hard disk drive may increase forces on the read/write head therein due to turbulent airflow within the drive. Further, such undesired air may cause the read/write heads to "fly" at too great a distance above the disks. The risk of unexpected failure due to inadequate concentration of helium within such drives is a considerable drawback to helium-filled disk drives, particularly since the data stored within the disk drive can be irretrievably lost if the disk drive fails.

Conventional problems associated with helium-filled hard disk drives are being overcome, but solutions are slow to evolve. Recently, HGST, a Western Digital company, announced its 6 TB Ultrastar He6 hard disk drive based on HGST's trademarked HelioSeal technology. According to a 2013 press release, such technology provides the industry's first helium-filled platform that simultaneously increases disk drive capacity while lowering its power consumption and operating temperature.

Effective cooling of hard disk drives is becoming a notable challenge due to increased power consumption and associated generation of heat in high performance devices, but with less space for efficient airflow as device sizes decrease. One solution for decreasing hard disk drive operating temperature that has been explored is liquid cooling. Liquid, which is denser than air, can remove heat more efficiently and maintain a more constant operating temperature. While traditional hard disk drives cannot be submerged as they are open to the atmosphere and would allow the cooling liquid inside, damaging or destroying the hard disk drive, HGST's HelioSeal™ platform is also described by HGST as providing a cost-effective solution for liquid cooling as the drives are hermetically sealed and are described as enabling operation in most any non-conductive liquid.

Thus, sealing of hard disk drives is desired for not only containment of a gaseous medium within the hard disk drive, but for prevention of entry of liquid medium external to the hard disk drive. With a growing emphasis on increasing storage density and decreasing device size, reduction of power consumption and reduction of heat generated during operation of hard disk drives is increasingly important.

Overheating is purported to be a common cause of hard disk drive failure. Overheating can, for example, cause platters in the drive to expand. If the disk's read-and-write head comes in contact with the disk's surface, a catastrophic head crash can result. Immersion of certain hard disk drives in liquid cooling mediums is, thus, being explored. For example, 3M Co. (St. Paul, Minn.) markets engineered fluid heat transfer medium under the NOVEC trade designation for use with electronic components. In order to take advantage of such liquid cooling mediums, effective sealing of a hard disk drive to eliminate or minimize leakage is desired.

Elimination of or minimization of leakage is desired for other reasons as well. One such reason relates to a reduction of complications arising from electromagnetic interference. Electromagnetic interference ("EMI," also called radio frequency interference or "RFI") is a usually undesirable disturbance caused in an electrical circuit by electromagnetic radiation emitted from an external source. Such disturbance may interrupt, obstruct, or otherwise degrade or limit the effective performance of the circuit.

EMI can be induced intentionally for radio jamming, as in some forms of electronic warfare, or unintentionally, as a result of spurious emissions and responses, intermodulation products, and the like. A source of EMI may be any object, artificial or natural, that carries rapidly changing electrical currents, such as another electrical circuit or even the sun or Northern Lights. Broadcast transmitters, two-way radio transmitters, paging transmitters, and cable television are also potential sources of EMI within residential and commercial environments. Other potential sources of EMI include a wide variety of common household devices, such as doorbell transformers, toaster ovens, electric blankets, ultrasonic pest controls (e.g., bug zappers), heating pads, and touch-controlled lamps. It is known that EMI frequently affects the reception of AM radio in urban areas. It can also affect cell phone, FM radio, and television reception, although to a lesser extent. EMI can similarly affect performance of a computer.

In conventional disk drives, unwanted and potentially problematic EMI wavelengths can enter a disk drive through a number of places. For example, similar to paths of gas leakage, such wavelengths can enter disk drive housings around screws used to hold multiple components of the housing together. Junctions where components of the hard disk drive housing (e.g., cover and base) meet are another potential path of gas leakage.

Within integrated circuits, the most important means of reducing EMI include the following: the use of bypass or "decoupling" capacitors on each active device (connected across the power supply and as close to the device as possible), risetime control of high-speed signals using series resistors, and Vcc filtering. If all of these measures still leave too much EMI, shielding such as using radio frequency (RF) gasket seals (which are often very expensive) and copper tape has been employed. Another method of reducing EMI is via use of metal hard disk drive components. While the use of metal components undesirably increases the overall weight of an apparatus, use of metal components has been conventionally mandated in the hard disk drive industry due to the EMI sensitivity of mechanical spinning components therein. Without mechanical spinning components therein, however, manufacturers of flash drives have taken advantage of the benefits of, for example, a plastic case for enclosure of the drive. See, for example, U.S. Pat. No. 7,301,776, which describes how metal material used for top and bottom plates of the drives described therein can be replaced by plastic as there are fewer EMI issues associated with flash memory devices as compared to mechanical spinning hard disk drives.

Another source of potential hard disk drive failure stems from electrostatic discharge (ESD). ESD refers to a sudden and momentary electric current that flows between two objects at different electrical potentials. The term is usually used in the electronics and other industries to describe momentary unwanted currents that may cause damage to electronic equipment. Ways to eliminate problematic ESD are in need of improvement as performance demands of hard disk drives increase.

While the aforementioned problems typically arise based on events and/or materials external to a disk drive, other problems may arise based on events and/or materials internal to a disk drive. That is, design of components within conventional disk drives can contribute to hard disk drive failure. For example, plastic components are susceptible to outgassing and components made from conductive materials are prone to shedding of particles, both of which can cause catastrophic disk failure.

In view of the number of potential problems impacting effective and long-term performance of hard disk drives, alternative methods and apparatus for improved hard disk drives are desired. Most desired are those methods and apparatus with improved efficiency and reliability over conventional attempts to provide the same.

SUMMARY OF THE INVENTION

Improved hard disk drives of the invention are wrapped in a wrap that is metallically sealed to itself for enhanced sealing of the hard disk drive. Wrapped hard disk drives of the invention comprise: an enclosed hard disk drive housing comprising a base and a cover enclosed around internal components for facilitating reading and recording of data at a desired location on at least one disk contained within the housing; and a wrap comprising an optional outwardly exposed adhesive layer; an optional outwardly exposed protective layer; at least one metallic layer interposed between the optional outwardly exposed adhesive layer, if present, and the optional outwardly exposed protective layer, if present; and a fusible metal alloy adjacent at least a portion of at least one side of the at least one metallic layer, wherein the fusible metal alloy is outwardly exposed at one or more locations where the wrap is capable of being metallically sealed to itself when forming the wrapped hard disk drive.

The wrap is wrapped around the enclosed hard disk drive housing in an at least partially overlapping manner and metallically sealed to itself to form the wrapped hard disk drive and prevent undesired migration therethrough such that a sealed environment exists within the wrapped hard disk drive. According to one aspect of the invention, wrapped hard disk drives of the invention are hermetically sealed.

A method for forming the wrapped hard disk drive of the invention comprises steps of: preparing the wrap; enclosing the base and the cover around the internal components to form the enclosed hard disk drive housing; sizing the wrap to fit around the enclosed hard disk drive housing; wrapping the wrap around the enclosed hard disk drive housing to form the wrapped hard disk drive; and metallically sealing the wrap to itself. In one embodiment, before wrapping the same around the enclosed hard disk drive housing, the wrap is stored for later wrapping around the enclosed hard disk drive housing after it is prepared. In another embodiment, any metal coating within the wrap is formed in the absence of the enclosed hard disk drive housing.

DETAILED DESCRIPTION OF THE PREFERRED EMBODIMENTS OF THE INVENTION

Wraps of the invention are beneficially applied in conjunction with a wide variety of conventionally formed hard disk drives (also referred to herein simply as "disk drives"). In general, a disk drive assembly conventionally includes a base to which various components of the disk drive are mounted. A top cover (also referred to simply as a "cover") cooperates with the base to form an enclosed housing that defines an encased environment for the disk drive. The enclosed housing (also referred to herein as an "enclosed hard disk drive housing"), thus, includes an exterior surface, an interior surface, and a defined internal volume.

Any hard disk drive comprises any of a number of suitable components encased within the housing. The internal components within the disk drive include, for example, a spindle motor, which rotates one or more magnetic disks at a constant high speed, and an actuator assembly for writing information to and reading information from circular tracks on the disks. The actuator assembly typically includes a plurality of actuator arms extending towards the disks, with one or more flexures extending from each of the actuator arms. Mounted at the distal end of each of the flexures is a read/write head, which includes an air bearing slider enabling the head to fly in close proximity above the corresponding surface of the associated disk during operation of the disk drive. When the disk drive is powered down, the heads may be moved to a landing zone at an innermost region of the disks where the air bearing sliders are allowed to land on the disk surface as the disks stop rotating. Alternatively, the actuator assembly may move (unload) the heads beyond the outer circumference of the disks so that the heads are supported away from the disk surface by a load/unload ramp when the drive is powered down.

Figure 1:
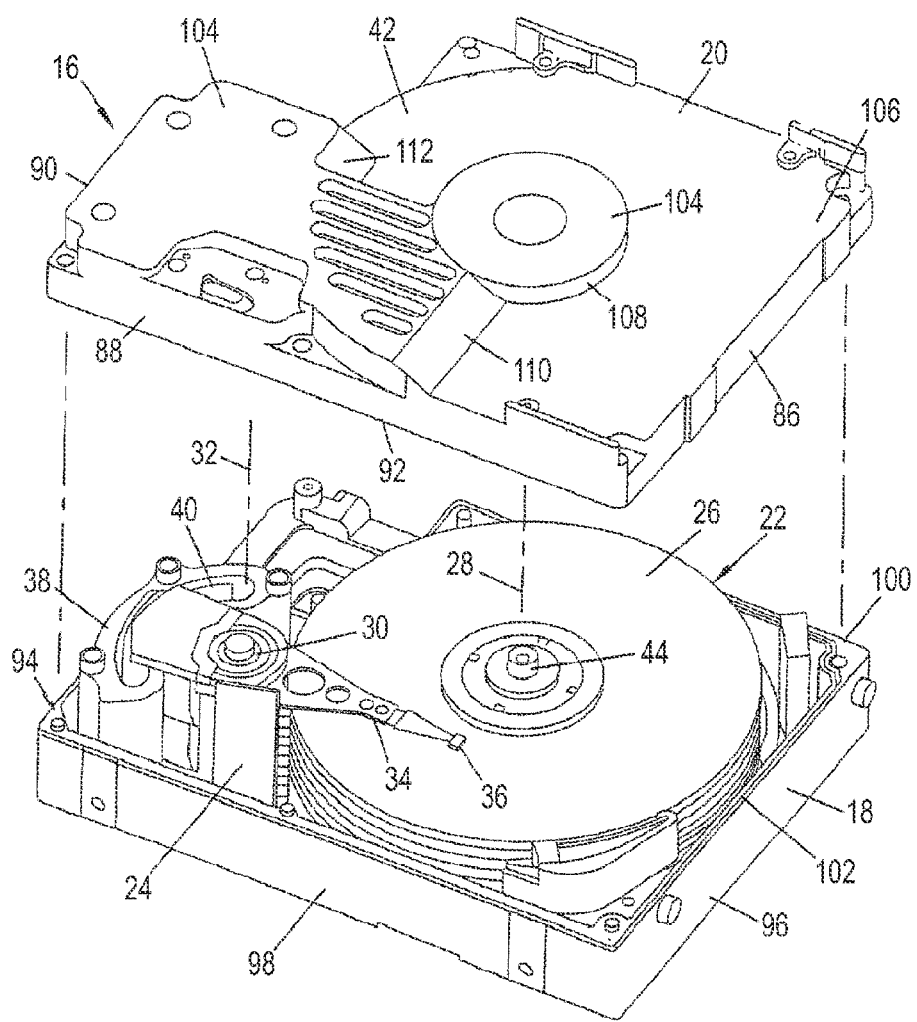
FIG. 1 is a partial perspective view of a prior art hard disk drive with the cover of the drive housing removed to illustrate certain features.

Turning now to the drawings, there is shown in FIG. 1 part of a prior art hard disk drive 16 described in U.S. Patent Publication No. 2003/0223148. The prior art hard disk drive 16 illustrated in FIG. 1 is only one example of many well-known embodiments of hard disk drives and is illustrated to show exemplary components of hard disk drives for use as a reference in conjunction with a description of the present invention. Recognize, however, that many conventional hard disk drives can be modified according to the improvements of the invention.

As shown in FIG. 1, a conventional hard disk drive 16 has a rigid outer housing including a base 18 and a cover 20. In FIG. 1, the cover 20 is removed from the base 18 to reveal a disk pack or spindle assembly 22 and a rotary actuator 24, both of which are mounted moveably with respect to the housing formed by the base 18 and cover 20. More particularly, the spindle assembly 22 includes a top disk 26 and several additional concentrically stacked and spaced-apart disks rotatable about a vertical spindle axis 28.

Rotary actuator 24 includes an actuator shaft 30 mounted to pivot relative to the base 18 about a vertical actuator axis 32. Transducer support arms, including a top support arm 34, are fixed to rotate with the actuator shaft 30. Each arm carries a magnetic data transducing head—e.g., a transducing head 36 on a support arm 34. The rotary actuator 24 pivots to move the transducing head 36 along arcuate paths generally radially with respect to the disks. Selective actuator 24 pivoting, in combination with controlled rotation of the disks, allows reading and recording of data at a desired location at any one of the disk recording surfaces. Rotary actuator 24 is pivoted by selective application of an electrical current to a voice coil 38 supported for arcuate movement within a magnetic field created by a permanent magnet arrangement 40, which includes several magnets and a pole piece (both of which are not illustrated in further detail).

The rotary actuator 24 and spindle assembly 22 are supported between two opposed housing walls, including a top wall 42 of the cover 20 and a bottom wall (not shown) of the base 18. Spindle shaft 44 and the actuator shaft 30 may be stationary—meaning that they are integral with the housing—with the disks and support arms being mounted to rotate relative to their respective shafts.

The cover 20 includes a vertical continuous sidewall structure including a rearward wall 86, two opposed sidewalls, one of which is shown at 88, and a forward wall 90. Here, the sidewall structure includes a generally flat, horizontal continuous bottom edge 92, though some embodiments may include a flange or other mated fitting so as to fit into a top edge 100 of base 18, facilitating a tight fit and/or laser-welding. The base 18 includes a vertical continuous sidewall structure, including a forward wall 94, a rearward wall 96, and two opposed sidewalls, one of which is shown at 98. These walls 94, 96, 98 combine to form a continuous, horizontal top edge 100. FIG. 1 also illustrates an elastomeric gasket seal 102 mounted to the top edge 100 of the base 18. When the cover 20 is assembled onto the base 18, the confronting bottom edge 92 of the cover 20 and the top edge 100 of the base 18 are brought into sealing engagement to enclose the housing about the spindle assembly 22 and the rotary actuator 24.

The upper and lower sidewalls 88, 98 are generally relatively thick to lend rigidity to the housing. The top wall 42 of the cover 20 may be formed with a horizontal full height region 104 and a horizontal recessed region 106, the two types of regions being interconnected by several non-horizontal regions as indicated at 108, 110, and 112. One portion of the full height region 104 accommodates the rotary actuator 24 and the spindle assembly 22. The non-horizontal regions 108, 110, 112 provide additional stiffness to the top wall 42 of the cover 20, which strengthens the top wall 42 and enables a somewhat reduced thickness wall construction.

During exemplary manufacture and assembly of a hard disk drive according to the invention, a base and a cover (i.e., a structural cover as opposed to a secondary sealing cover attached to an already enclosed housing) are provided and enclosed around components internal to the hard disk drive within a clean room environment to form an enclosed hard disk drive housing. Any suitable mechanism can be used to mechanically couple components (e.g., the base and cover) of the hard disk drive housing when forming the enclosed hard disk drive housing. When an electrical connector is also to be assembled such that it protrudes external to the housing, it is likewise assembled within the clean room environment. It is to be understood that an electrical connector can extend from a wrapped hard disk drive according to the invention without detracting from benefits of wrapping.

A wrap of the invention is then wrapped around the exterior surface of the enclosed hard disk drive housing and metallically sealed to itself in order to create a sealed environment within the hard disk drive. The metallic sealing process involves metallically joining a metallic portion of the wrap to another metallic portion of the wrap to form a metallic joint. The metallic portions of the wrap are joined by brazing or soldering, as opposed to welding, and are preferably on adjacent, overlapping layers of the wrap. Preferably, at an overlap to be metallically sealed according to the invention, adjacent layers of the wrap overlap a distance that is at least about three times, even at least about six times, thickness of the wrap. That is, the overlap has a length of at least about three times, even at least about six times, thickness of the wrap.

A joint is, thus, formed at each position of overlap. Although the joints formed according to the invention could have a butt-welded style, preferably each joint has an overlap-style. Exemplary overlap-style joints include lap joints, standing joints (also referred to as vertical joints, which can be folded down flush with the surface of the hard disk drive before or after metallic sealing thereof), and flat lock joints. As opposed to lap joints, where facing portions of the metallic layer are from the opposite major surfaces of the wrap, facing portions of the metallic layer are from the same major surface of the wrap within standing joints and flat lock joints. It is to be understood that the term "seam" is used interchangeably with the term "joint" herein and as understood by one of ordinary skill in the art.

According to one aspect of the invention, the wrap is metallically sealed in multiple steps. For example, the wrap can be first wrapped around the enclosed hard disk drive housing and partially metallically sealed so that the enclosed hard disk drive housing can be easily removed from the same during, for example, testing and re-working of the hard disk drive. In this manner, the wrap may take the form of an open-ended pouch at an intermediate stage of a method of forming a wrapped hard disk drive of the invention. Once removal of the hard disk drive is no longer necessary or desired, the remainder of the pouch is metallically sealed. When required dimensions are known (e.g., when wrapping hard disk drives having the same form factor), such a pouch can be formed without first wrapping the wrap around the enclosed hard disk drive housing around which it will be metallically sealed.

According to one aspect of the invention, a continuous metallic path (but for that portion of the path where any electrical connector or other structure, if any, exits the enclosed hard disk drive housing) exists around the periphery of the wrapped hard disk drive, regardless of the route taken therearound. A sealed environment is, thus, created with the wrapped hard disk drive. In an exemplary embodiment, an improved hard disk drive of the invention is capable of providing and maintaining an adequate sealed environment for at least five years. An adequate sealed environment is one in which hard disk drive performance is not significantly affected due to leakage. According to one embodiment, at least about 90% by volume, preferably at least about 95% by volume, of a gaseous medium originally contained within a hard disk drive remains after ten years. Any suitable methodology can be used to detect leakage of a gaseous medium from a hard disk drive and amounts thereof.

According to one aspect of the invention, wrapped hard disk drives of the invention are hermetically sealed to maintain a predetermined concentration of a low density gas within the internal environment of the hard disk drive over a service lifetime of the drive (e.g., leaking helium at such a low rate that it would take over seventy years for the helium concentration to drop below a predetermined lower limit, which lower limit is selected according to the minimum concentration of helium needed for acceptable performance).

In contrast to coatings formed in-situ on an article, wraps of the invention, as well as certain individual layers in exemplary embodiments thereof, are capable of being physically separated from a substrate on which they are formed and maintaining their integrity as a continuous structure. As such, wraps are preferably formed before manufacture of an enclosed hard disk drive housing that is wrapped according to the invention.

Before being wrapped around an enclosed hard disk drive housing, wraps of the invention generally have a sheet-like construction, where length and width dimensions of the wrap greatly exceed thickness of the wrap. In an exemplary embodiment, wraps are manufactured in series via a web-based process, stored in roll form, and then easily divided into individual wraps (e.g., via perforations therebetween) prior to wrapping around an enclosed hard disk drive housing.

Wraps of the invention can be applied to the enclosed hard disk drive housing in a relatively efficient and unitary manner. Due to advantages associated with metallic sealing of the wrap itself when forming a wrapped hard disk drive, the present invention is an improvement over the laminate-wrapped hard disk drives and related methods described in co-pending U.S. Provisional Patent Application No. 62/009,843 (GLF Ref. No. entrotech 14-0008).

In their most basic form, wraps of the invention comprise at least one metallic layer. The metallic layer functions as a barrier layer and is flexible enough to facilitate wrapping of the wrap around the enclosed hard disk drive housing. The metallic layer also beneficially imparts metallic properties to the wrap.

Metallic layers of the invention comprise any suitable metal, including aluminum, chrome, copper, stainless steel, and nickel. In a preferred embodiment, the metallic layers comprise a metal selected from aluminum and stainless steel.

In a preferred embodiment, the first (and sometimes only) metallic layer takes the form of a metal foil. For example, the metallic layer is a metal foil (e.g., a dead soft aluminum foil) in one embodiment. A wide variety of metal foils are commercially available. For example, a variety of suitable aluminum foils are available from A.J. Oster Foils, Inc. (Alliance, Ohio).

In a further embodiment, the wrap consists of a reactive, multi-layer foil having at least two adjacent metallic layers. For example, Indium Corporation (Elk Grove Village, Ill.) provides reactive, multi-layer foils under the trade designation, NanoFoil. Such reactive, multi-layer foils are fabricated by vapor-depositing thousands of alternating nanoscale layers of aluminum (Al) and nickel (Ni). When activated by a small pulse of local energy from electrical, optical, or thermal sources, the foil reacts exothermically to precisely deliver localized heat in fractions (e.g., thousandths) of a second.

In another embodiment, the metallic layer takes the form of a metal coating. For example, a metallic layer comprising a metal coating can be formed on the outwardly exposed protective layer during fabrication of the wrap.

Metal coatings can be formed using any suitable methodology, preferably using vacuum deposition, including, for example, spray coating (e.g., plasma coating), sputter coating, or plating techniques, as known to those of ordinary skill in the art. For example, the number and duration of passes using sputter coating equipment can vary depending on the nature of the metal, component, and desired properties. Multiple passes to form multiple contiguous layers was found to reduce or eliminate potential problems associate with pinholes or other defects often found in metal coatings. As such, formation of a metal coating using multiple passes is preferred. For example, at least two sputter coating passes, each pass forming a coating having an optical density of about 2.8, can be used to form an adequate metal coating according to one embodiment of the invention. Any material capable of being deposited or plated may be coated using technologies known to those of ordinary skill in the art. For example, any sputter coating target material may be used to form the metal coating.

As used herein, a metal coating is defined as a single layer or multiple contiguous layers of essentially the same metal. The metal coating may be a continuous layer or a discontinuous layer or multiples thereof. Further, the thickness of the metal coating can vary according to properties desired. For ease of manufacture, however, it is often preferred that the metal coating is a uniformly thick coating of the same metal.

In one embodiment, the metal coating comprises at least two individual layers. In another embodiment, the metal coating comprises at least about four individual layers. In still another embodiment, the metal coating comprises at least about six individual layers. In yet another embodiment, the metal coating comprises at least about ten individual layers. Understand that each individual layer need not be the same thickness or type of metal; although, uniformity thereof is often preferred for process simplicity.

As discussed above, preferably the metal coating comprises multiple layers in order to minimize the possibility of pinholes or other defects negatively impacting shielding or containment properties of the hard disk drive. In those embodiments where containment of inert gas within the hard disk drive is of concern, metal coatings preferably comprise more and/or thicker layers. When multiple layers are used, for example, the chance of defects resulting in through paths for undesired electromagnetic interference and gaseous particles is minimized. The through transmission rate for such particles is essentially zero according to preferred embodiments. Preferably, the leakage rate for helium particles through wraps of the invention is less than about $3\times10^{-9}$ Pa·m$^3$/sec.

While equipment and methodology for formation of metal coatings can be costly and require tightly controlled processing parameters, as compared to coating of a hard disk drive described in U.S. Patent Publication No. 2012/0275105 A1, any metal coating in wraps of the invention is not part of the basic hard disk drive manufacturing process. Rather, wraps are prepared and typically stored for later use. Thus, use of metal coatings in metallic layers of the invention does not negatively affect efficiency of the basic hard disk drive manufacturing process by requiring that the hard disk drive itself be subjected to the coating equipment and methodology.

In an exemplary embodiment, the metallic layer has a thickness of less than about 100 microns, preferably less than about 40 microns. In a preferred embodiment, the metallic layer has a thickness of about 25 microns. Use of such a relatively thin metallic layer contributes to its conformability within wraps of the invention. For example, conformability of the metallic layer facilitates intimate contact thereof with the outwardly exposed adhesive layer, if present, so that gaps are minimized or, preferably, eliminated therebetween. Such conformability improves sealing properties and also facilitates effective use of wraps of the invention in wrapping hard disk drives having curved or other non-planar surfaces.

The metallic layer may be constrained (i.e., the metallic layer is positioned between additional continuous or discontinuous non-adhesive layers on both sides thereof) or non-constrained (i.e., no additional non-adhesive layers surround both sides of the metallic layer). When present, in a preferred embodiment, the constrained metallic layer comprises a metal coating constrained by the first and second polymeric layers. The first and second polymeric layers each comprise any suitable material and thickness. Each of the first polymeric layer and the second polymeric layer need not comprise the same material. Similarly, each of the first polymeric layer and the second polymeric layer need not have the same thickness. In an exemplary embodiment, however, each of the first and second polymeric layers comprises polyurethane and has a thickness of about 5 microns to about 10 microns.

The first and second polymeric layers assist in minimizing, and preferably eliminating, development of cracks in the constrained metallic layer, which is generally thinner than non-constrained metallic layers used in wraps of the invention, especially when non-constrained metallic layers comprise a metal foil. As is understood by those of ordinary skill in the art, cracks within a metallic layer negatively affect sealing properties of the wrap. Nevertheless, in order to further guard against potential negative effects from development of cracks within metallic layers of the invention, use of both a first non-constrained metallic layer and a constrained metallic layer for redundancy within a wrap is advantageous. In those embodiments, the first non-constrained metallic layer preferably takes the form of a metal foil.

During metallic sealing of the wrap, structural integrity of the metallic layer remains beneficially uncompromised. That is, unlike within welded joints, the original interfacial division is maintained between adjacent portions of the metallic layer within metallic joints of the invention. Maintenance of the original interfacial division at those adjacent portions of the wrap can be confirmed by viewing the same with the aid of a microscope. Again, it is to be understood that metallic sealing of the invention is differentiated from welding in that the metallic layer within wraps of the invention does not melt when metallically sealing a hard disk drive according to the invention.

Wraps of the invention also include a fusible metal alloy adjacent the metallic layer at each position thereon where a metallic joint is to be formed. The fusible metal alloy is distinct from the metallic layer referenced herein and can be applied to the metallic layer before or after the wrap is wrapped around the enclosed hard disk drive housing. Note that the fusible metal alloy is not taken into account in the above discussion of constrained and non-constrained metallic layers.

To facilitate metallic sealing of the wrap after it is wrapped around the enclosed hard disk drive housing, preferably the metallic layer is pre-treated on at least a portion of one major surface thereof by, for example, applying a layer of a fusible metal alloy (e.g., solder) having a lower melting point than that of the metallic layer. Those of ordinary skill in the art are readily familiar with methodology for forming a layer of a fusible metal alloy. Depending on materials involved, this methodology is often referred to as "pre-tinning" or "pre-plating." Any suitable methodology that facilitates effective metallic sealing of the wrap may be used.

The metallic layer can be pre-treated on one or both major surfaces, preferably both major surfaces, to allow more flexibility in wrapping configurations. According to one embodiment, a metallic layer is pre-treated on at least one entire major surface with a fusible metal alloy of a thickness sufficient to form a desired metallic joint. Although the fusible metal alloy need only be present at those portions of the metallic layer adjacent the metallic joint to be formed, pre-treating at least one entire major surface facilitates wrapping of the wrap around a hard disk drive of any form factor and with more freedom as to positioning of overlaps introduced when wrapping an enclosed hard disk drive housing as such. Pre-treating at least one entire major surface also advantageously eliminates or minimizes the need for specialized equipment otherwise needed for patterned application of the fusible metal alloy to only a portion of a major surface of the metallic layer.

Nevertheless, the metallic layer can be pre-treated in a continuous or discontinuous manner. The only portions of the metallic layer that need be pre-treated according to a preferred embodiment are those portions of the metallic layer adjacent the metallic joint to be formed in the wrap. Those portions of the metallic layer include at least two facing portions—for example, those portions of the metallic layer that are present on each side of an overlap. While only one of the two facing portions of the metallic layer need be pre-treated, both facing portions are pre-treated according to a preferred embodiment.

Since the wrap is primarily metallically sealed to itself, pre-treating of the hard disk drive components is advantageously not necessary. In an exemplary embodiment, the exterior of the enclosed hard disk drive housing is essentially free of tin or similar materials known to be used in pre-treating a surface to be soldered or brazed.

Thickness of the fusible metal alloy layer can vary, but is generally selected so that the wrap can be effectively metallically sealed at desired portions thereof. For example, thickness of the fusible metal alloy layer is large enough to facilitate adequate wetting of the fusible metal alloy on facing portions of the metallic layer where a metallic joint is to be formed. At least one of those facing portions of the metallic layer includes a fusible metal alloy layer. Thickness of the fusible metal alloy layer is also small enough so that wetting of the fusible metal alloy on facing portions of the metallic layer where a metallic joint is to be formed can effectively occur by capillary action. In an exemplary embodiment, thickness of the fusible metal alloy layer is at least about 20% of thickness of the adjacent metallic layer on which it is applied.

In one embodiment, thickness of the fusible metal alloy layer is at least about 16 microns at any portion of the wrap where metallic sealing is desired. According to a further embodiment, thickness of the fusible metal alloy layer is at least about 25 microns at any portion of the wrap where metallic sealing is desired. According to yet a further embodiment, thickness of the fusible metal alloy layer is at least about 50 microns at any portion of the wrap where metallic sealing is desired. According to still yet a further embodiment, thickness of the fusible metal alloy layer is at least about 75 microns at any portion of the wrap where metallic sealing is desired. For example, a fusible metal alloy layer(s) having a combined thickness of about 75 microns to about 250 microns at an overlap of the wrap was found to make for strong metallic joints at portions of the wrap metallically sealed according to the invention.

In an exemplary further embodiment, wraps of the invention comprise a combination of at least one metallic layer and an outwardly exposed adhesive layer laminated thereto. The outwardly exposed adhesive layer facilitates ready adherence of the wrap to the external surface of the enclosed hard disk drive housing and facilitates positioning of the wrap during wrapping of the enclosed hard disk drive housing.

When present, the outwardly exposed adhesive layer comprises any suitable base material and additives. According to one embodiment, the outwardly exposed adhesive layer generally comprises a base polymer with one or more additives. While any suitable chemistry can be used for the base polymer in the adhesive layer, (meth)acrylate (i.e., acrylate and methacrylate) chemistry is preferred. In particular, an adhesive based on 2-ethyl hexyl acrylate, vinyl acetate, and acrylic acid monomers polymerized as known to those skilled in the art can be used as the base polymer. However, other suitable chemistries are known to those skilled in the art and include, for example, those based on synthetic and natural rubbers, polybutadiene and copolymers thereof, and polyisoprene and copolymers thereof. In a preferred embodiment, to promote self-adherence of the outwardly exposed adhesive layer to the enclosed hard disk drive housing, the outwardly exposed adhesive layer comprises a pressure-sensitive adhesive (PSA).

When present, the outwardly exposed adhesive layer comprises any suitable thickness. In one embodiment, the outwardly exposed adhesive layer has a thickness of about 5 microns to about 150 microns. In an exemplary embodiment, the outwardly exposed adhesive layer is about 25 microns thick or less. However, the thickness of the outwardly exposed adhesive layer can vary substantially without departing from the spirit and scope of the invention.

When present, the outwardly exposed adhesive layer may be substantially continuous or discontinuous. For example, the outwardly exposed adhesive layer comprises multiple islands of adhesive on the metallic layer according to one embodiment. The islands are spaced apart on the metallic layer in an essentially uniform manner according to one variation of this embodiment. According to another variation of this embodiment, the islands are spaced apart on the metallic layer in an essentially non-uniform manner. Nevertheless, the metallic layer is essentially free of outwardly exposed adhesive and other materials (e.g., solder-resistant materials) not conducive to metallic sealing at those portions of the metallic layer corresponding to facing portions of an overlap where a metallic joint is to be formed when the wrap is wrapped around the enclosed hard disk drive housing.

When present, the outwardly exposed protective layer functions to protect the metallic layers from damage, but its presence in wraps of the invention is optional. In any event, the outermost metallic layer is essentially free of outwardly exposed protective layer and other materials (e.g., solder-resistant materials) not conducive to metallic sealing at those portions of the metallic layer corresponding to facing portions of an overlap where a metallic joint is to be formed when the wrap is wrapped around the enclosed hard disk drive housing.

When present, any suitable material may be used for the outwardly exposed protective layer. In an exemplary embodiment, the outwardly exposed protective layer comprises at least one of polyester, polyurethane, polyolefin, and thermoplastic elastomer (e.g., that sold by DuPont under the HYTREL trade designation) components. Due to its preferential resistance to punctures, for example, polyurethane is a preferred material for the outwardly exposed protective layer.

The outwardly exposed protective layer comprises any suitable thickness. In an exemplary embodiment, the outwardly exposed protective layer has a thickness of about 25 microns to about 100 microns. In another embodiment, the outwardly exposed protective layer has a thickness of about 20 microns to about 50 microns. In a further embodiment, the outwardly exposed protective layer has a thickness of about 25 microns to about 40 microns.

In order to adequately adhere multiple layers within the wrap, when present, a laminating adhesive layer may be present between, for example, the outwardly exposed protective layer and the first polymeric layer constraining the constrained metallic layer. Similarly, a laminating adhesive layer may be present between, for example, the first metallic layer and the second polymeric layer constraining the constrained metallic layer. Any suitable adhesive can be used for such laminating adhesive layers, each of which may not comprise the same chemistry and/or thickness.

According to one embodiment, a laminating adhesive layer generally comprises a base polymer with one or more suitable additives. While any suitable chemistry can be used for the base polymer, (meth)acrylate (i.e., acrylate and methacrylate) chemistry is preferred. In particular, an adhesive based on 2-ethyl hexyl acrylate, vinyl acetate, and acrylic acid monomers polymerized as known to those skilled in the art can be used as the base polymer. However, other suitable chemistries are known to those skilled in the art and include, for example, those based on synthetic and natural rubbers, polyurethane, polyester, polybutadiene and copolymers thereof, and polyisoprene and copolymers thereof. In one embodiment, the laminating adhesive layer comprises a pressure-sensitive adhesive (PSA).

If used, laminating adhesive layers comprise any suitable thickness. In one embodiment, the laminating adhesive layers each have a thickness of less than about 5 microns (e.g., about 2 microns).

Thickness of each of the layers within wraps of the invention may vary, individually and in combination. Combined thickness of the layers in wraps of the invention is at least about 40 microns in one embodiment. In a further embodiment, the combined thickness is at least about 50 microns. In yet a further embodiment, the combined thickness is at least about 200 microns. As thickness increases, durability increases, but conformability generally decreases. In an exemplary embodiment, in order to balance these competing properties, the combined thickness is about 50 microns to about 75 microns.

When the wrap includes non-metallic layers (e.g., the optional outwardly exposed adhesive layer, the optional outwardly exposed protective layer, internal laminating adhesives, or polymeric layers encompassing a constrained metallic layer), those non-metallic layers are eliminated from those facing portions of the metallic layer adjacent the metallic joint to be formed in the wrap. Elimination may be accomplished by, for example, actually eliminating those layers from the wrap at an overlap to be metallically sealed or effectively eliminating them by using a vertical overlap-style joint, whereby the facing portions of the metallic layer are from the same major surface of the wrap. As an example, when the wrap includes an outwardly exposed protective layer across one entire major surface, the wrap can be wrapped and metallically sealed around an enclosed hard disk drive housing so that the overlap forms a vertical joint with the outwardly exposed protective layer being outwardly exposed on both sides of the vertical joint (i.e., so that the same major surface of the wrap comprises the facing portions of the metallic layer therein).

Recognize, however, that additional layers may be included on exterior surfaces of the wrap and removed before wrapping of the wrap around an enclosed hard disk drive housing according to the invention. For example, a temporary release liner or similar temporary protective material may be present to protect the otherwise outwardly exposed adhesive layer from particulate contamination and unwanted adherence of the same before the wrap is wrapped around an enclosed hard disk drive housing. Before wrapping, the temporary release liner or similar temporary protective material, if present, is first removed from the wrap.

Figure 2A:
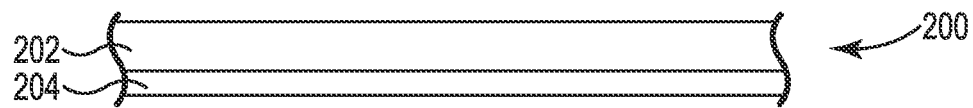
FIG. 2A is a partial cross-sectional view of one embodiment of a wrap for wrapping around an enclosed hard disk drive housing according to the invention.

In one embodiment, as illustrated in FIG. 2A, a wrap 200 of the invention consists essentially of a metallic layer 202 and an outwardly exposed adhesive layer 204. The metallic layer 202 shown in FIG. 2A is non-constrained.

Figure 2B:
FIG. 2B is a partial cross-sectional view of a further embodiment of the wrap of FIG. 2A.
Figure 2C:
FIG. 2C is a partial cross-sectional view of a further embodiment of the wrap of FIG. 2B.

According to a further embodiment, as illustrated in FIG. 2B, a wrap 200 of the invention consists essentially of a metallic layer 202 interposed between an outwardly exposed adhesive layer 204 and an outwardly exposed protective layer 206. In order to adequately adhere the layers 204, 206, an internal laminating adhesive layer 208 may be present between the metallic layer 202 and the outwardly exposed protective layer 206, as illustrated in FIG. 2C. As compared to the outwardly exposed adhesive layer 204, laminating adhesive layer 208 is internally positioned between layers 202, 206 within the wrap 200 such that it is essentially not outwardly exposed.

Figure 2D:
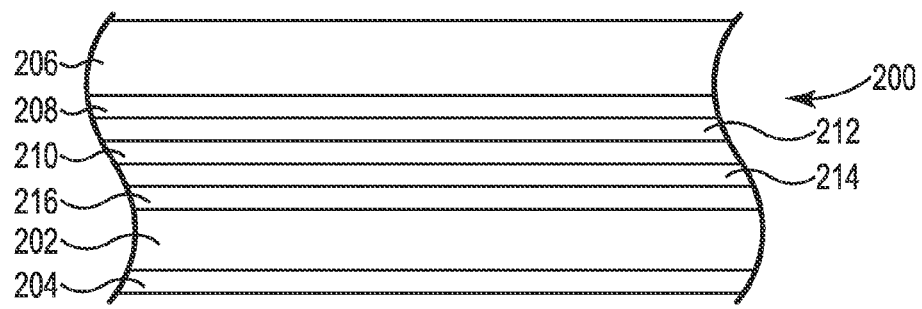
FIG. 2D is a partial cross-sectional view of another embodiment of a wrap for wrapping around an enclosed hard disk drive housing according to the invention.
Figure 2E:
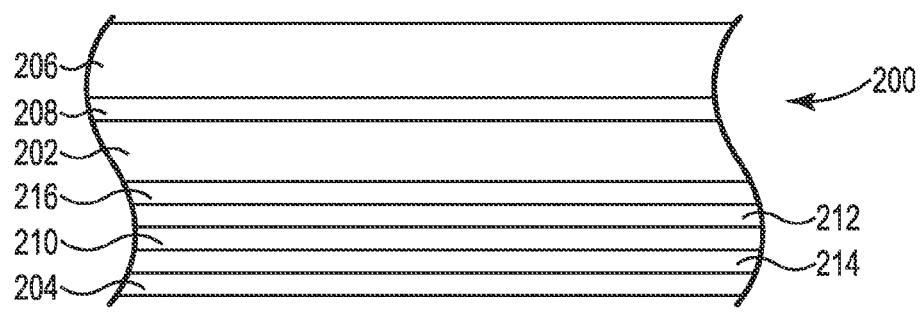
FIG. 2E is a partial cross-sectional view of still another embodiment of a wrap for wrapping around an enclosed hard disk drive housing according to the invention.

According to another exemplary embodiment, as illustrated in FIG. 2D, a wrap 200 of the invention consists essentially of not only a first metallic layer 202, but also a constrained metallic layer 210. The constrained metallic layer 210 is constrained between first and second polymeric layers 212, 214. In order to adequately adhere the layers 206, 212, a laminating adhesive layer 208 may be present between the outwardly exposed protective layer 206 and the first polymeric layer 212 constraining the constrained metallic layer 210. A laminating adhesive layer 216 may also be present between the first metallic layer 202 and the second polymeric layer 214 constraining the constrained metallic layer 210, as illustrated in FIG. 2D. The sequence of layers may be rearranged so that the first metallic layer 202 is proximate the outwardly exposed protective layer 206 and the constrained metallic layer 210 is proximate the outwardly exposed adhesive layer 204, as illustrated in FIG. 2E. In all cases, as compared to the outwardly exposed adhesive layer 204, laminating adhesive layers 208, 216 are internally positioned between two or more layers 202, 206, 212, 214 within the wrap 200 such that they are essentially not outwardly exposed.

Figure 2F:
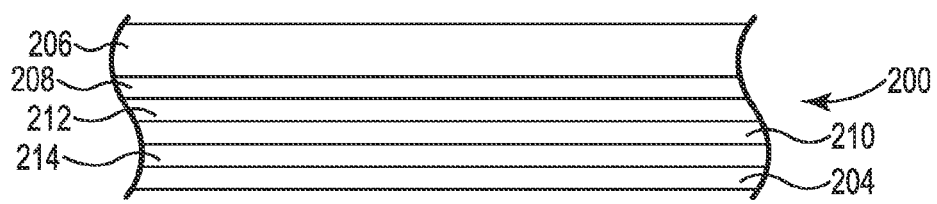
FIG. 2F is a partial cross-sectional view of yet another embodiment of a wrap for wrapping around an enclosed hard disk drive housing according to the invention.

According to another exemplary embodiment, as illustrated in FIG. 2F, a wrap 200 of the invention consists essentially of a metallic layer 210 constrained between first and second polymeric layers 212, 214. In order to adequately adhere layers 206, 212, a laminating adhesive layer 208 may be present between the outwardly exposed protective layer 206 and the first polymeric layer 212 constraining the constrained metallic layer 210. Again, as compared to the outwardly exposed adhesive layer 204, laminating adhesive layer 208 is internally positioned between layers 202, 212 within the wrap 200 such that it is essentially not outwardly exposed.

Figure 2G:
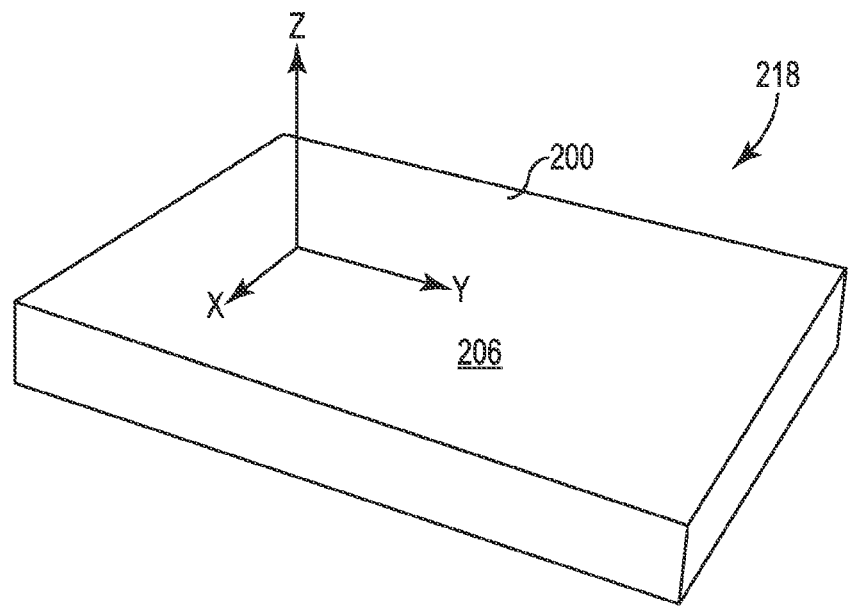
FIG. 2G is a generalized perspective view of a wrapped hard disk drive comprising the wrap of FIG. 2B, FIG. 2C, FIG. 2D, FIG. 2E, or FIG. 2F wrapped therearound.

Depending on the configuration, as illustrated in FIGS. 2A-2F, each of the first metallic layer 202 and the constrained metallic layer 210, alone or in combination, functions to prevent undesired migration therethrough such that a sealed environment exists within wrapped hard disk drives according to the invention. For example, the metallic layers 202, 210 prevent or minimize migration of gaseous medium from within the wrapped hard disk drive 218 (e.g., helium or nitrogen when the hard disk drive is hermetically sealed) according to one embodiment as illustrated in FIG. 2G.

According to another embodiment, the metallic layers 202, 210 prevent or minimize migration of oxygen from outside the wrapped hard disk drive 218. In yet another embodiment, the metallic layers 202, 210 prevent or minimize migration of liquid medium from outside the wrapped hard disk drive 218 (e.g., liquid cooling medium in which the hard disk drive is immersed).

When the outwardly exposed adhesive layer 204 is present, a wrap 200 of the invention is wrapped around an enclosed hard disk drive housing such that the outwardly exposed adhesive layer 204 contacts and adheres to the enclosed hard disk drive housing. In another embodiment, the wrap 200 also comprises an outwardly exposed protective layer 206 that is outwardly exposed on the wrapped hard disk drive 218. See, for example, FIGS. 2J-2K.

As the wrap 200 is wrapped around the hard disk drive housing after it is enclosed around internal components for facilitating reading and recording of data at a desired location on at least one disk contained within the housing, the junction at which the base and cover components of the enclosed hard disk drive housing meet is not exposed in wrapped hard disk drives of the invention. Moreover, in order to adequately seal the hard disk drive with the wrap, the wrap 200 is at least partially overlapped therearound so that the enclosed hard disk drive housing is not exposed (i.e., visible) in wrapped hard disk drives of the invention. The overlapping wrap 200 is then metallically sealed according to the invention.

According to the invention, a wrap 200 is wrapped around an enclosed hard disk drive housing in an at least partially overlapping manner and then metallically sealed to form the wrapped hard disk drive and prevent undesired migration therethrough such that a sealed environment exists within the wrapped hard disk drive. In one embodiment, at least two layers of wrap 200 are present on a major portion of the wrapped hard disk drive. In a further embodiment, at least three layers of wrap 200 are present on a major portion of the wrapped hard disk drive.

Before wrapping the enclosed hard disk drive housing, the wrap 200 is first sized to fit around the enclosed hard disk drive housing 220. Recognize that the wrap 200 may include one or more distinct wrap portions forming the entire wrap, such that the distinct wrap portions are not connected to each other prior to wrapping and metallic sealing steps of the invention. When the wrap 200 includes two or more distinct wrap portions, portions of the metallic layer where the distinct wrap portions meet when the wrap 200 is wrapped around the enclosed hard disk drive housing 220 are metallically sealed according to the invention.

The wrap 200 is sized so that the entire wrap 200 envelops the enclosed hard disk drive housing 220. When sized according to an exemplary aspect of the invention, at least one of the length and the width of the wrap 200 is at least one-hundred times the thickness of the wrap 200. In a further embodiment, at least one of the length and the width of the wrap 200 is at least one-thousand times the thickness of the wrap 200.

The wrap 200 is sized so that it at least envelops the enclosed hard disk drive housing 220. Preferably, the wrap 200 envelops the enclosed hard disk drive housing 220 such that an overlap between adjacent layers of the wrap 200 measures at least 0.3 mm (0.01 inch), more preferably at least 5.1 mm (0.2 inch), even more preferably at least 12.7 mm (0.5 inch), and even more preferably at least 25.4 mm (1.0) inch of overlap.

When sized according to one aspect of this embodiment, a major surface of the wrap 200 has an area that is greater than the surface area of the enclosed hard disk drive housing 220 to be wrapped. As some surfaces have recesses and/or surface imperfections, it is to be understood that the areas and surface areas referred to herein are not "true" areas and surface areas on at least a microscopic scale, but rather projected areas in the x- and y-planes and projected surface areas in the x-, y-, and z-planes. For example, according to this aspect of the invention, a major surface of the wrap 200 has an area (i.e., wrap surface area) that is greater than the surface area of the enclosed hard disk drive housing 220 (e.g., surface area of the form factor). In one embodiment, the wrap surface area is at least 105% of the surface area of the enclosed hard disk drive housing 220. In a further embodiment, the wrap surface area is at least 115% of the surface area of the enclosed hard disk drive housing 220. In a further embodiment still, the wrap surface area is at least 125% of the surface area of the enclosed hard disk drive housing 220. In yet another embodiment, the wrap surface area is at least 150% of the surface area of the enclosed hard disk drive housing 220.

When sized according to one aspect of this embodiment, the wrap 200 is capable of forming an envelope structure having an internal volume that is greater than the volume of the enclosed hard disk drive housing (e.g., volume of the form factor) to be enveloped. In one embodiment, the internal volume of such an envelope structure is at least 105% of the volume of the enclosed hard disk drive housing 220. In a further embodiment, the internal volume of such an envelope structure is at least 115% of the volume of the enclosed hard disk drive housing 220. In a further embodiment still, the internal volume of such an envelope structure is at least 125% of the volume of the enclosed hard disk drive housing 220. In yet another embodiment, the internal volume of such an envelope structure is at least 150% of the volume of the enclosed hard disk drive housing 220.

Figure 2H:
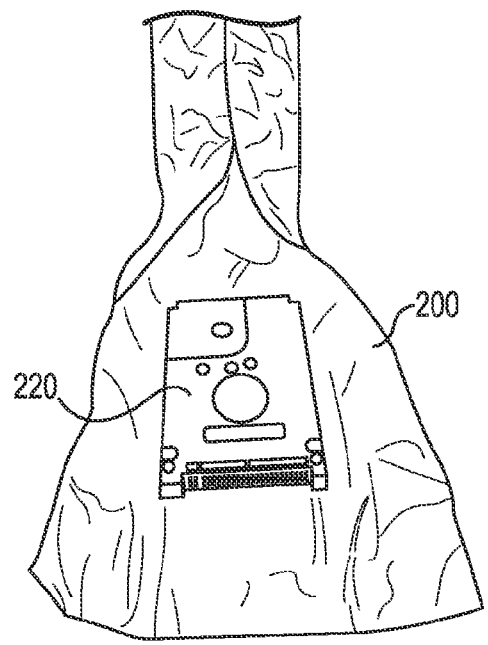
FIG. 2H is a top perspective view of one embodiment of a step of wrapping an enclosed hard disk drive housing with a wrap.

The invention is not limited to enclosed hard disk drive housings of any particular size and can be used with any type of hard disk drive. Recognize that hard disk drives often exist in one or more standard form factors, which form factors can vary in height (e.g., full height, half-height, low-profile, and ultra-low-profile). For illustration purposes only, Table 1 illustrates several widely used form factors for personal computer hard disk drives and associated dimensions (where "SA" refers to surface area). Several other form factors are known, including PC Card (PCMCIA) and CompactFlash form factors, for example.

is wrapped around the portion of the enclosed hard disk drive housing 220 having the largest surface area (e.g., the top, bottom and largest sides of the hard disk drive, which extend along yz-planes and xy-planes illustrated in FIG. 2G). The wrap 200 is wrapped to overlap itself so that at least one layer of wrap 200 is interposed between the enclosed hard disk drive housing 220 and an end of the wrap 200 exposed on the yz- or xy-plane of the wrapped hard disk drive 218. FIG. 2H illustrates the step of wrapping the wrap 200 in the aforementioned embodiment, wherein the wrap 200 overlaps itself on the xy-plane of the enclosed hard disk drive housing 220.

In one embodiment, the wrap 200 is wrapped as such so that least two layers of wrap 200 are interposed between the enclosed hard disk drive housing 220 and the exposed end of the wrap 200 on the yz- or xy-plane of the wrapped hard disk drive 218. In a further embodiment, the wrap 200 is wrapped so that least three layers of wrap 200 are interposed between the enclosed hard disk drive housing 220 and the exposed end of the wrap 200 on the yz- or xy-plane of the wrapped hard disk drive 218.

Figure 2I:
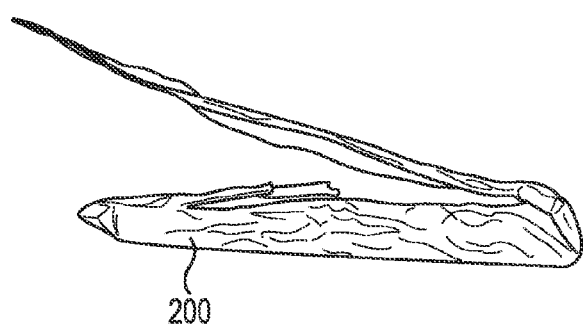
FIG. 2I is a side perspective view of a further step of wrapping the enclosed hard disk drive housing with a wrap according to FIG. 2H.
Figure 2J:
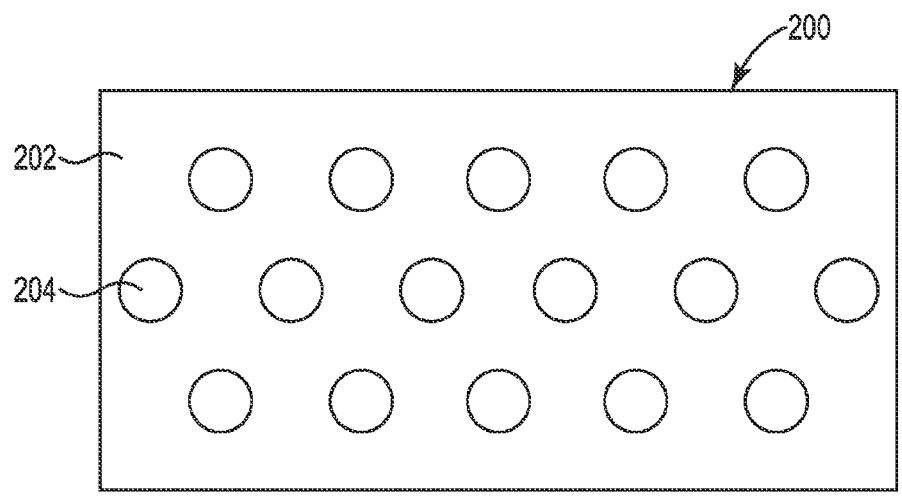
FIG. 2J is one embodiment of a plan view of the wrap of FIGS. 2A-2F, as viewed from the side comprising the outwardly exposed adhesive layer.
Figure 2K:
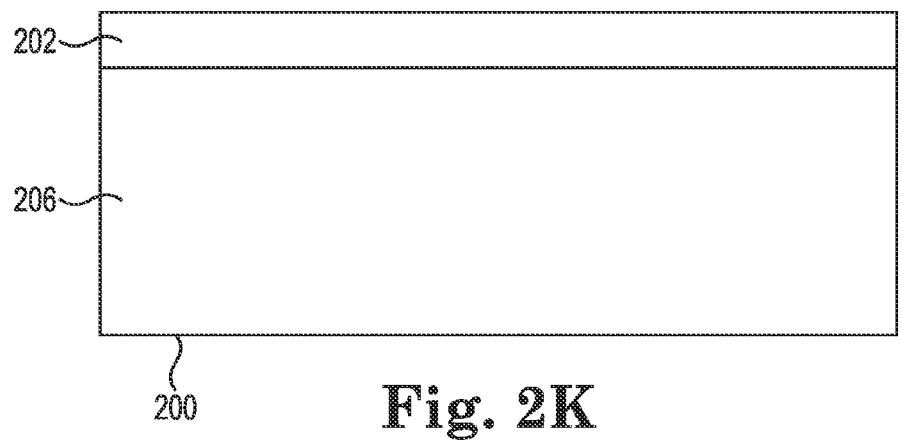
FIG. 2K is one embodiment of a plan view of the wrap of FIGS. 2B-2F, as viewed from the side comprising the outwardly exposed protective layer.

As illustrated in FIG. 2I, the wrap 200 is then wrapped around the exposed sides of the enclosed hard disk drive housing 220, which extend along xz-planes illustrated in FIG. 2G. For example, a portion of the wrap 200 extending outward from a top side of the enclosed hard disk drive housing 220 in the xy-plane along one exposed side of the enclosed hard disk drive housing 220 is first folded down and then the portions of the wrap 200 extending outward from opposing sides of the enclosed hard disk drive housing 220 in the yz-plane are folded inward by creating two diagonal creases. The portion of the wrap 200 extending outward from a bottom side of the enclosed hard disk drive housing 220 in the xy-plane along the exposed side is then folded up to cover the side of the enclosed hard disk drive housing 220. The process is repeated for the opposing exposed side of the enclosed hard disk drive housing 220.

According to a preferred aspect of this embodiment, as illustrated in FIG. 2I, the wrap 200 is sized with relatively long flap portions of the wrap 200 extending along the y-axis of the enclosed hard disk drive housing 220 at one or more exposed side of the enclosed hard disk drive housing 220. The flap portions should be at least as long as the height of the enclosed hard disk drive housing 220. By ensuring that such flap portions are relatively long, the migratory path at the interface between mating flap portions is increased

TABLE 1

| | | | | Form Factor | | | |
|---|---|---|---|---|---|---|---|
| | Width (in/mm) | Depth (in/mm) | Height (in/mm) | Vol. of Form Factor (cu. in/cm$^3$) | Overall SA of Form Factor (sq. in/cm$^2$) | SA of xy-Plane (sq. in/cm$^2$) | SA of xz-Plane (sq. in/cm$^2$) | SA of yz-Plane (sq. in/cm$^2$) |
| 2.5-inch, 12.5-mm Height | 2.75/ 69.85 | 3.94/ 100.08 | 0.49/ 12.45 | 5.31/ 87.01 | 28.23/ 182.13 | 10.84/ 69.94 | 1.93/ 12.45 | 1.35/ 8.71 |
| 2.5-inch, 9.5-mm Height | 2.75/ 69.85 | 3.94/ 100.08 | 0.37/ 9.40 | 4.01/ 65.71 | 26.62/ 171.74 | 10.84/ 69.94 | 1.46/ 9.42 | 1.02/ 6.58 |
| 3.5-inch Half-Height | 4.00/ 101.60 | 5.75/ 146.05 | 1.63/ 41.40 | 37.49/ 614.35 | 77.79/ 501.87 | 23.00/ 148.39 | 9.37/ 60.45 | 6.52/ 42.06 |
| 3.5-inch Low Profile | 4.00/ 101.60 | 5.75/ 146.05 | 1.00/ 25.40 | 23.00/ 376.90 | 65.50/ 422.58 | 23.00/ 148.39 | 5.75/ 37.10 | 4.00/ 25.81 |

In an exemplary embodiment, the wrap 200 is wrapped around an enclosed hard disk drive housing 220 in much the same manner as wrapping a gift in paper. The sized wrap 200 accordingly. A longer migratory path corresponds to a decreased chance that liquid and/or gaseous medium is able to successfully enter or leave the wrapped hard disk drive

218. Preferably, each flap portion extends from the enclosed hard disk drive housing 220 a distance of at least about two times, more preferably at least about three times, height of the enclosed hard disk drive housing 220 before it is folded to cover each outwardly exposed side of the enclosed hard disk drive housing 220.

It is to be understood that wraps of the invention are generally sized and wrapped to cover each outwardly exposed side of the enclosed hard disk drive housing. However, when an electrical connector or other feature (e.g., helium fill port) exits the enclosed hard disk drive housing for connection with external components, some opening generally exists for the same within the wrapped hard disk drive. Preferably, the junction between that feature and the wrap within a wrapped hard disk drive of the invention is adequately sealed (e.g., by metallically sealing similar to the way the wrap is sealed to itself). It is also preferred that the feature itself is adequately sealed (e.g., hermetically sealed).

In one embodiment, when an electrical connector or other feature exits the enclosed hard disk drive housing, the wrap does not cover an opening within the enclosed hard disk drive housing where such a feature exits the same. Such openings may be non-linear as described in, for example, U.S. Pat. No. 8,593,760, incorporated by reference herein. For purposes of this invention, an opening within the enclosed hard disk drive housing where a feature exits that is not covered with the wrap generally has a surface area (projected onto the plane of which it is a part) that is less than fifty-percent of the surface area of the plane of which it is a part.

Figure 3A:
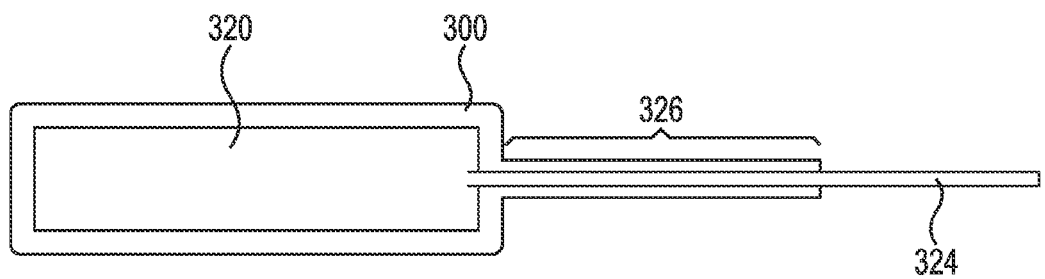
FIG. 3A is a cross-sectional view of a hard disk drive with an electrical connector being wrapped with a wrap according to the invention.

According to another embodiment, although the opening within the enclosed hard disk drive housing where the feature exits is covered with the wrap, there is another opening within the wrapped hard disk drive where the feature exits. For example, a flexible electrical connector 324 (e.g., actuator flex cable) exiting the enclosed hard disk drive housing 320 can be routed between opposing portions of the wrap 300 as it is wrapped around the enclosed hard disk drive housing 320, as illustrated in FIG. 3A. For example, sides of the wrap 300 in the yz-plane extending from the sides of the enclosed hard disk drive housing 320 are first folded in and then sides of the wrap 300 in the xy-plane extending from the top and bottom of the enclosed hard disk drive housing 320 are pressed together before being folded over to form the wrapped hard disk drive 318. In order to further maximize the migratory path along the electrical connector 324 before it exits the wrapped hard disk drive 318, the wrapped portion 326 of the electrical connector 324 can be folded over the enclosed hard disk drive housing 320, such as in the manner illustrated in FIG. 3B. By folding the wrapped portion 326 of the electrical connector 324, a tortuous path is created to maximize the migratory path and, thus, minimize migration therethrough. Creation of tortuous paths for increasing the migratory path along electrical connectors exiting enclosed hard disk drive housings is described in U.S. Pat. No. 8,593,760, the contents of which are incorporated herein by reference. The tortuous paths described therein can be adapted according to the present invention by folding the wrap 300 accordingly. By folding the wrapped portion 326 of the electrical connector 324, the form factor of the wrapped hard disk drive 318 can also be optimized.

According to further embodiment, a wrapped hard disk drive of the invention includes a further electrical connector, such as a hermetically sealed electrical connector, that may be attached to a conventional electrical connector (e.g., rigid pin connector) exiting the enclosed hard disk drive housing. Hermetically sealed electrical connectors are known and described in, for example, U.S. Pat. Nos. 5,157,831, 8,098, 454, and 8,194,348. Thereafter, the hermetically sealed electrical connector can be metallically sealed to the wrap, which is wrapped around the remainder of the enclosed hard disk drive housing before or after attachment thereof to the enclosed hard disk drive housing, in order to provide a hermetically sealed wrapped hard disk drive. In an alternative embodiment, a hermetically sealed electrical connector is used in place of a conventional non-hermetic electrical connector and metallically sealed to the wrap.

In any event, given that the wrap 200, 300 is wrapped around the enclosed hard disk drive housing and metallically sealed primarily to itself when creating a sealed environment, relatively difficult adhesion to what is, for example, often an untreated metal surface (e.g., cast aluminum) on an enclosed hard disk drive housing 220 is not an issue. Further, as such, it is generally unnecessary to prepare the exterior surface of the enclosed hard disk drive housing 220 for metallic sealing.

In one embodiment, the wrap 200, 300 envelops the enclosed hard disk drive housing, but the wrap 200, 300 is not mechanically (i.e., through adhesive or other means) attached to the exterior surface of the enclosed hard disk drive housing 220, much like a letter would be sealed inside an appropriate-sized envelope so that it can be readily removed from the envelope when opened. Although the wrap 200, 300 may include an outwardly exposed adhesive layer 204 in certain embodiments, the wrap 200, 300 need not aggressively adhere to the exterior surface of the enclosed hard disk drive housing 220. However, the wrap 200, 300 is preferably formed so that it intimately conforms to the topography of essentially the entire exterior surface of the enclosed hard disk drive housing 220 when forming a wrapped hard disk drive 218 according to an exemplary embodiment, as illustrated in FIG. 2G.

Figure 3B:
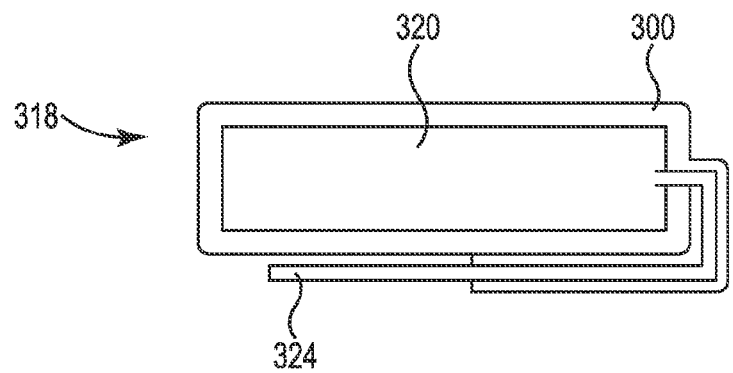
FIG. 3B is a cross-sectional view of a further embodiment of the hard disk drive of FIG. 3A.

A wrapped hard disk drive 218 of the invention may be formed using one continuous wrap 200, 300 as described, for example, in conjunction with FIGS. 3A-3B and FIG. 2G or multiple wrap portions. For example, as illustrated in FIGS. 4A-4D, three distinct (i.e., not connected) wrap portions 400, 401 (a third not shown) are used to form a wrapped hard disk drive of the invention. According to this embodiment, the combined areas of major surfaces of each of the distinct wrap portions 400, 401 is greater than the surface area of the enclosed hard disk drive housing 420 to be wrapped.

According to one aspect of this embodiment, as illustrated in FIGS. 4A-4D, a first wrap portion 400 is wrapped around the sides of the enclosed hard disk drive housing 420 (e.g., the sides of the hard disk drive, which extend along yz-planes and xz-planes illustrated in FIG. 2G, such that the first wrap portion 400 is wrapped perpendicular to and around the z-axis). The first wrap portion 400 is wrapped to overlap itself so that at least one layer of wrap 400 is interposed between the enclosed hard disk drive housing 420 and an end of the first wrap portion 400 exposed on the yz- or xz-plane of the wrapped hard disk drive.

Figure 4A:
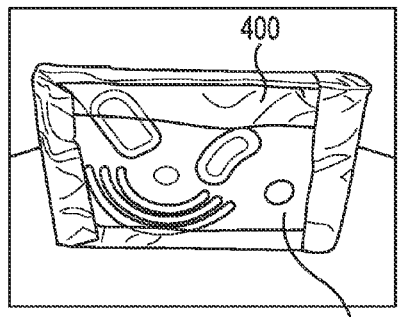
FIG. 4A is a bottom perspective view of a partially wrapped hard disk drive comprising a first wrap portion.
Figure 4B:
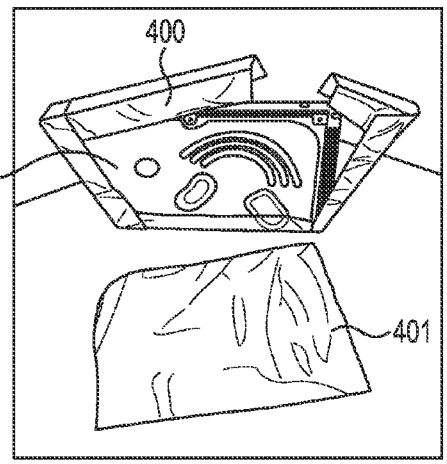
FIG. 4B is an alternative bottom perspective view of the partially wrapped hard disk drive of FIG. 4A, wherein a first wrap portion and second wrap portion are shown.
Figure 4C:
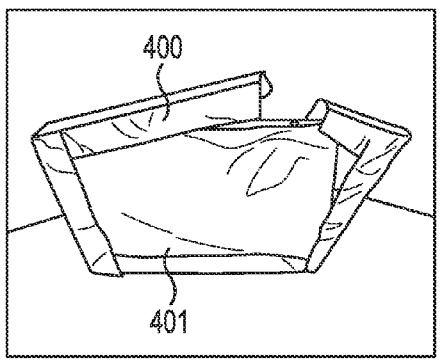
FIG. 4C is an alternate bottom perspective view of the partially wrapped hard disk drive of FIG. 4B, wherein the second wrap portion is positioned on the bottom of the enclosed hard disk drive housing.
Figure 4D:
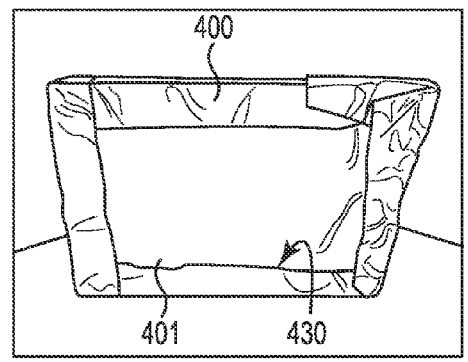
FIG. 4D is an alternative bottom perspective view of the partially wrapped hard disk drive of FIG. 4C.

As illustrated in FIGS. 4B-4D, a second wrap portion 401 and third wrap portion are then positioned to cover the exposed top and bottom of the enclosed hard disk drive housing 420, which top and bottom extend along xy-planes illustrated in FIG. 2G. The second wrap portion 401 and the third wrap portion are positioned to overlap with the first wrap portion 400. A seam is, thus, formed at each position of overlap. The positioning of the wrap portions at the seams—i.e., determining which wrap portion is outwardly exposed—can vary. For example, a seam 430 formed by the overlap with the first wrap portion 400 may have either, or a combination of, the first wrap portion 400 or the second wrap portion 401 or third wrap portion outwardly exposed.

In the embodiment illustrated in FIGS. 4B-4D, a seam 430 is formed on each of the top and bottom surfaces of the enclosed hard disk drive housing 420. However, recognize that a seam 430 may not be present on each of the top and bottom surfaces of the enclosed hard disk drive housing 420. For example, the first wrap portion 400 may be positioned underneath another wrap portion that is sized to wrap around the enclosed hard disk drive housing 420, covering both the top and bottom surfaces and, optionally, at least a portion of one or more of the sides covered by the first wrap portion 400. In that manner, positioning of the seam 430 may vary according to the exact sizing, positioning, and number of distinct wrap portions comprising the whole.

Figure 5:
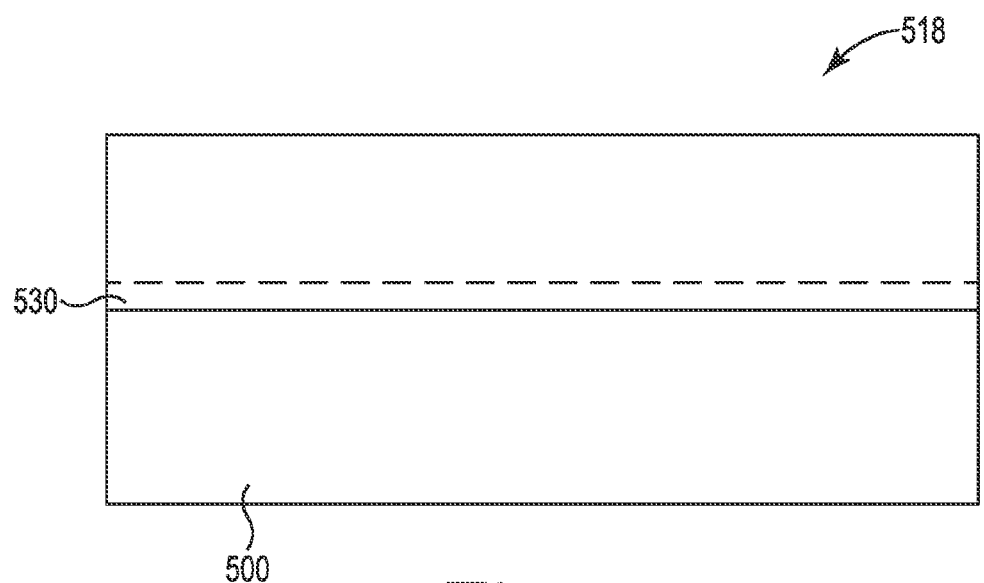
FIG. 5 is a plan perspective view of one embodiment of a wrapped hard disk drive of the invention.

Any suitable materials and methodology can be used for metallically sealing the wrap 500 once wrapped around the enclosed hard disk drive housing in order to form the wrapped hard disk drive 518 according to the invention and as shown in, for example, FIG. 5. Methodology for metallic sealing via brazing and soldering and materials (e.g., fusible metal alloys) therefor are well known to those of ordinary skill in the art.

Fusible metal alloys (e.g. solder) used in the invention have a liquidus temperature below the melting point of the metallic layer within wraps of the invention. Any suitable fusible metal alloy can be used according to the invention. For example, solder used according to the invention can be a hard solder or soft solder. According to one embodiment, a soft solder is used for metallic sealing according to the invention. A soft solder has a liquidus temperature of 90° C. to 450° C. (190° F. to 840° F.). In contrast, a hard solder has a liquidus temperature of greater than 450° C. (840° F.). In a preferred embodiment, a soft solder used for metallic sealing according to the invention has a liquidus temperature of 180° C. to 190° C. (360° F. to 370° F.).

For improved efficiency in certain applications, a eutectic solder is selected and used for metallic sealing according to the invention. A eutectic solder has a melting point in that it melts at an essentially single temperature. In contrast, non-eutectic solder has markedly different solidus and liquidus temperatures and, hence, no defined melting point. Within the temperature range (i.e., melting interval) between the solid and liquid phases, a non-eutectic alloy solder generally exists as a paste of solid particles in a melt of the lower-melting phase within the alloy (i.e., a solder paste).

According to one embodiment, a solder paste is used for metallic sealing according to the invention. In general, fusible metal alloy layers can be formed from solder pastes using, for example, stencil printing and jet dispensing technologies and equipment. Equipment for jet dispensing of solder is commercially available from MYDATA automation, Inc. (Rowley, Mass.) as, for example, the MY600 Jet Printer. Solder pastes are commercially available from, for example, AIM Metals and Alloys LP (Cranston, R.I.). Exemplary solder pastes available from AIM Metals and Alloys LP include a tin-lead, no-clean solder paste having the trade designation, NC257MD Sn63. This exemplary solder paste is described as being applicable to a substrate using a jet printer, which is advantageous in certain embodiments.

Alloys of lead and tin are common for soft solder and are particularly convenient for hand-soldering. Lead-free solder, while somewhat less convenient for hand-soldering, is often used to avoid the environmental effect of lead. Lead-free solder according to the invention conforms to the European Union's Waste Electrical and Electronic Equipment Directive (WEEE) and Restriction of Hazardous Substances Directive (RoHS). Exemplary lead-free solder may contain two or more of tin, copper, silver, bismuth, indium, zinc, antimony, and traces of other metals. According to one embodiment, a lead-free solder is used for solder-sealing according to the invention. Lead-free solders are also commercially available from, for example, AIM Metals and Alloys LP (Cranston, R.I.). Exemplary solders available from AIM Metals and Alloys LP include a lead-free, no-clean solder paste having the trade designation, NC257-2.

Superior Flux & Mfg. Co. (Cleveland, Ohio) is a commercial supplier of a variety of solder materials. Alloys of indium, such as those available from Indium Corporation (Elk Grove Village, Ill.), are often preferred due to their generally lower liquidus temperature than that associated with other soft solders.

Fusible metal alloys are also available in powder form, which may optionally include a minor amount of a binder effective to facilitate coalescence of the solder. In one embodiment, fusible metal alloy in powder form is applied to the metallic layer and then fused (e.g., by heating the alloy) to the metallic layer.

In addition to paste and powder forms, fusible metal alloys may be provided in other forms. For example, solder wire is available in a range of thicknesses and with cores containing flux. Fusible metal alloys can be applied to a substrate using any suitable technology (e.g., jet printing, cladding, hot dipping, reflowing, vapor deposition, electroplating, and electroless plating). Materion Technical Materials (Lincoln, R.I.) has several coatable solders available. Fusible metal alloys are also available as a preform shaped to match the workpiece.

According to one embodiment, a preform is used for metallic sealing according to the invention. A preform is a pre-made shape of fusible metal alloy specially designed for the application where it is to be used. The preform can be plain or can include a flux for the metallic sealing process as an internal flux (i.e., with flux inside the preform) or external flux (i.e., with the preform coated with the flux). Any suitable method can be used to manufacture the preform. For example, a preform can be made by stamping solder ribbon/strip that has been rolled to the specific thickness of the application. Array Solders (Kearny, N.J.), Indium Corporation (Elk Grove Village, Ill.), and other commercial suppliers can be utilized to make such preforms and often provide fusible metal alloys in other forms suitable for use according to the present invention. For example, Indium Corporation provides Clad Solder Preforms, which consist of a copper layer clad on one or both sides with a specified thickness of solder.

Any suitable methodology and equipment can be used for positioning/placement of the fusible metal alloy, some of which are described above. The metallic layer may also be obtained commercially in a pre-treated form. Suppliers of such pre-treated metallic layers include, for example, Orbel Corporation (Easton, Pa.) and Aurubis (Buffalo, N.Y.). If a thicker fusible metal alloy layer is desired than what is present on such commercially obtained pre-treated metallic layers, additional fusible metal alloy can be added thereto.

At least one fusible metal alloy is positioned on at least one portion of the metallic layer facing another portion of the metallic layer at an overlap formed (e.g., seam 530 where two layers of the wrap 500 overlap, as shown in FIG. 5) when the wrap 500 is wrapped around an enclosed hard disk drive housing. The alloy is then fused, generally by application of heat at a temperature higher than the liquidus temperature of the alloy, to metallically seal the wrap therearound.

Various other modifications and alterations of the invention will become apparent to those skilled in the art without departing from the spirit and scope of the invention, which is defined by the accompanying claims. It should be noted that, unless indicated otherwise, steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language. Further, as used throughout, ranges may be used as shorthand for describing each and every value that is within the range. Any value within the range can be selected as the terminus of the range. Similarly, any discrete value within the range can be selected as the minimum or maximum value recited in describing and claiming features of the invention. Finally, any material or performance properties described or measured herein are those existing at room temperature and atmospheric pressure unless specified otherwise.

The invention claimed is:

1. A wrap capable of being metallically sealed to itself at one or more locations to form a wrapped hard disk drive, wherein the wrap consists essentially of:
    an outwardly exposed adhesive layer facilitating ready adherence of the wrap to the external surface of an enclosed hard disk drive housing comprising a base and a cover enclosed around internal components for facilitating reading and recording of data at a desired location on at least one disk contained within the housing;
    an optional outwardly exposed protective layer;
    at least one metallic layer interposed between the outwardly exposed adhesive layer and the optional outwardly exposed protective layer, if present; and
    a fusible metal alloy adjacent at least a portion of at least one side of the at least one metallic layer,
wherein the fusible metal alloy is outwardly exposed at one or more locations where the wrap is capable of being metallically sealed to itself when forming the wrapped hard disk drive.

2. The wrap of claim 1, wherein the optional outwardly exposed protective layer is present.

3. The wrap of claim 2, wherein the outwardly exposed protective layer has a thickness of about 25 microns to about 100 microns.

4. The wrap of claim 1, wherein the wrap is positioned such that at least two layers of the wrap overlap and the wrap is partially metallically sealed to itself via a joint formed at the overlap.

5. The wrap of claim 4, wherein the overlap has a length of at least about three times thickness of the wrap.

6. The wrap of claim 1, wherein the at least one metallic layer comprises a reactive, multi-layer metal foil having at least two adjacent metallic layers.

7. The wrap of claim 1, wherein only one metallic layer and the fusible metal alloy is present in the wrap.

8. The wrap of claim 1, wherein the at least one metallic layer is a non-constrained metallic layer.

9. The wrap of claim 1, wherein the wrap comprises a first metallic layer and a second metallic layer.

10. The wrap of claim 1, wherein the at least one metallic layer comprises a metal foil.

11. The wrap of claim 1, wherein the at least one metallic layer comprises a metal coating.

12. The wrap of claim 1, wherein the at least one metallic layer comprises a metal selected from aluminum, chrome, copper, nickel, and stainless steel.

13. The wrap of claim 1, wherein the at least one metallic layer has a thickness of at least about 10 microns.

14. The wrap of claim 1, wherein the at least one metallic layer has a thickness of less than about 100 microns.

15. The wrap of claim 1, wherein the at least one metallic layer has a thickness of less than about 40 microns.

16. The wrap of claim 1, wherein the wrap has a thickness of at least about 40 microns.

17. The wrap of claim 1, wherein at least one of the length and the width of the wrap is at least about one-hundred times thickness of the wrap.

18. A wrapped hard disk drive comprising:
    an enclosed hard disk drive housing comprising a base and a cover enclosed around internal components for facilitating reading and recording of data at a desired location on at least one disk contained within the housing; and
    the wrap of claim 1 wrapped around the enclosed hard disk drive housing in an at least partially overlapping manner and metallically sealed to itself such that the fusible metal alloy in the wrap has been fused and the adhesive layer is no longer outwardly exposed to form the wrapped hard disk drive and prevent undesired migration therethrough such that a sealed environment exists within the wrapped hard disk drive.

19. The hard disk drive of claim 18, wherein the adhesive layer comprises a pressure-sensitive adhesive.

20. The wrap of claim 1, wherein the outwardly exposed adhesive layer comprises a pressure-sensitive adhesive.

21. A wrapped hard disk drive comprising:
    an enclosed hard disk drive housing comprising a base and a cover enclosed around internal components for facilitating reading and recording of data at a desired location on at least one disk contained within the housing; and
    a wrap wrapped around the enclosed hard disk drive housing in an at least partially overlapping manner and metallically sealed to itself to form the wrapped hard disk drive and prevent undesired migration therethrough such that a sealed environment exists within the wrapped hard disk drive,
wherein the wrap consists essentially of:
    an optional adhesive layer;
    an optional outwardly exposed protective layer;
    at least one metallic layer interposed between the optional adhesive layer, if present, and the optional outwardly exposed protective layer, if present; and
    a fusible metal alloy adjacent at least a portion of at least one side of the at least one metallic layer, and
wherein the fusible metal alloy in the wrap has been fused.

22. The wrap of claim 21, wherein the optional adhesive layer is present.

23. The hard disk drive of claim 21, wherein the hard disk drive is hermetically sealed.

24. The hard disk drive of claim 21, wherein at least two layers of the wrap are present on a major portion of the wrapped hard disk drive.

25. The hard disk drive of claim 21, wherein the wrap comprises at least two distinct wrap portions, wherein the at least two distinct wrap portions are not connected to each other prior to wrapping the wrap around the enclosed hard disk drive housing.

26. A method for forming the wrapped hard disk drive of claim 21, the method comprising steps of:
- preparing the wrap in which the fusible metal alloy has not yet been fused;
- enclosing the base and the cover around the internal components to form the enclosed hard disk drive housing;
- sizing the wrap to fit around the enclosed hard disk drive housing;
- wrapping the wrap around the enclosed hard disk drive housing to form the wrapped hard disk drive; and
- metallically sealing the wrap to itself by fusing the fusible metal alloy in the wrap.

27. The method of claim 26, wherein the wrap is stored for later wrapping around the enclosed hard disk drive housing after it is prepared.

28. The method of claim 26, wherein any metal coating within the wrap is formed in the absence of the enclosed hard disk drive housing.

29. The method of claim 26, wherein the wrap is metallically sealed using lead-free solder.

30. The method of claim 26, wherein the wrap is metallically sealed using a eutectic solder.

31. The hard disk drive of claim 21, wherein the adhesive layer comprises a pressure-sensitive adhesive.

\* \* \* \* \*

UNITED STATES PATENT AND TRADEMARK OFFICE
CERTIFICATE OF CORRECTION

| | | |
|---|---|---|
| PATENT NO. | : 9,601,161 B2 | Page 1 of 1 |
| APPLICATION NO. | : 14/687437 | |
| DATED | : March 21, 2017 | |
| INVENTOR(S) | : James E. McGuire, Jr. et al. | |

It is certified that error appears in the above-identified patent and that said Letters Patent is hereby corrected as shown below:

On the Title Page

Please replace the assignee Item (73) with the following:
--entrotech, inc., Columbus, OH (US)--

Signed and Sealed this
Sixteenth Day of May, 2017

Michelle K. Lee
*Director of the United States Patent and Trademark Office*